(12) United States Patent
Madafferi et al.

(10) Patent No.: US 11,805,032 B2
(45) Date of Patent: Oct. 31, 2023

(54) CUSTOMER SERVICE SYSTEMS AND PORTALS

(71) Applicant: SELFSERVEME PTY LTD., Melbourne (AU)

(72) Inventors: Leon Madafferi, Melbourne (AU); Gavin Bunshaw, Melbourne (AU)

(73) Assignee: SELFSERVEME PTY LTD., Melbourne (AU)

( * ) Notice: Subject to any disclaimer, the term of this patent is extended or adjusted under 35 U.S.C. 154(b) by 34 days.

(21) Appl. No.: 16/327,894

(22) PCT Filed: May 31, 2017

(86) PCT No.: PCT/AU2017/050520
§ 371 (c)(1),
(2) Date: Feb. 25, 2019

(87) PCT Pub. No.: WO2018/035554
PCT Pub. Date: Mar. 1, 2018

(65) Prior Publication Data
US 2019/0196682 A1 Jun. 27, 2019

(30) Foreign Application Priority Data
Aug. 24, 2016 (AU) ................. 2016903364

(51) Int. Cl.
*H04L 41/5051* (2022.01)
*G06Q 20/18* (2012.01)
(Continued)

(52) U.S. Cl.
CPC ........ *H04L 41/5051* (2013.01); *G06F 3/0484* (2013.01); *G06F 8/20* (2013.01);
(Continued)

(58) Field of Classification Search
CPC ...... G06F 3/0484; G06F 40/14; G06F 16/958; G06F 16/00; G06F 16/285; G06F 21/51;
(Continued)

(56) References Cited

U.S. PATENT DOCUMENTS 6,327,628 B1 * 12/2001 Anuff .................... G06F 16/954
707/999.009
7,519,653 B1 * 4/2009 Coutts ................... G07F 19/211
715/702
(Continued)

FOREIGN PATENT DOCUMENTS

| WO | WO-2013019913 A1 * | 2/2013 | ........... G06F 15/167 |
| WO | WO-2014165967 A1 * | 10/2014 | ............ G06Q 30/04 |
| WO | WO-2022246419 A1 * | 11/2022 | ............... G06F 8/35 |

OTHER PUBLICATIONS

Girija Devi, General Knowledge, Quora, "Who invented cache?" (Year: 2021).*

(Continued)

*Primary Examiner* — Jennifer E Nichols
(74) *Attorney, Agent, or Firm* — Kowert, Hood, Munyon, Rankin & Goetzel, P.C.

(57) ABSTRACT

A deployable customer self-service (CSS) system is described. The deployable CSS includes a user interface, a web portal configured to load and display the user interface, a service configured to provide data to the user interface based on a system of record or third party service, and an integration connector for connecting the service to the system of record or third party service such that the service is agnostic to the format of the system of record or third party service.

10 Claims, 21 Drawing Sheets

(51) Int. Cl.

| | | |
|---|---|---|
| *G06F 8/60* | (2018.01) | |
| *G06F 16/958* | (2019.01) | |
| *G06Q 10/10* | (2023.01) | |
| *G06Q 30/06* | (2023.01) | |
| *G06Q 40/12* | (2023.01) | |
| *G06Q 20/14* | (2012.01) | |
| *G06F 16/00* | (2019.01) | |
| *G06F 40/14* | (2020.01) | |
| *G06F 9/445* | (2018.01) | |
| *G06F 8/20* | (2018.01) | |
| *G06F 8/70* | (2018.01) | |
| *G06F 8/36* | (2018.01) | |
| *G06F 12/0891* | (2016.01) | |
| *G06F 21/51* | (2013.01) | |
| *G06F 21/60* | (2013.01) | |
| *G06F 16/172* | (2019.01) | |
| *G06F 40/106* | (2020.01) | |
| *G06F 16/9537* | (2019.01) | |
| *G06F 12/0871* | (2016.01) | |
| *G06Q 20/32* | (2012.01) | |
| *G06Q 20/20* | (2012.01) | |
| *G06Q 50/06* | (2012.01) | |
| *G06Q 30/04* | (2012.01) | |
| *G06Q 20/10* | (2012.01) | |
| *G06Q 20/22* | (2012.01) | |
| *H04L 41/5054* | (2022.01) | |
| *H04L 67/00* | (2022.01) | |
| *G06F 16/28* | (2019.01) | |
| *G06F 3/0484* | (2022.01) | |
| *G06Q 30/016* | (2023.01) | |
| *G06Q 20/12* | (2012.01) | |
| *G06Q 30/0601* | (2023.01) | |
| *G06F 40/186* | (2020.01) | |

(52) U.S. Cl.
CPC ............. *G06F 8/36* (2013.01); *G06F 8/60* (2013.01); *G06F 8/70* (2013.01); *G06F 9/44526* (2013.01); *G06F 12/0871* (2013.01); *G06F 12/0891* (2013.01); *G06F 16/00* (2019.01); *G06F 16/172* (2019.01); *G06F 16/285* (2019.01); *G06F 16/958* (2019.01); *G06F 16/9537* (2019.01); *G06F 16/972* (2019.01); *G06F 21/51* (2013.01); *G06F 21/606* (2013.01); *G06F 40/106* (2020.01); *G06F 40/14* (2020.01); *G06Q 10/10* (2013.01); *G06Q 20/102* (2013.01); *G06Q 20/14* (2013.01); *G06Q 20/145* (2013.01); *G06Q 20/18* (2013.01); *G06Q 20/20* (2013.01); *G06Q 20/22* (2013.01); *G06Q 20/3221* (2013.01); *G06Q 20/3223* (2013.01); *G06Q 30/016* (2013.01); *G06Q 30/04* (2013.01); *G06Q 30/06* (2013.01); *G06Q 40/123* (2013.12); *G06Q 50/06* (2013.01); *H04L 41/5054* (2013.01); *H04L 67/34* (2013.01); *G06F 40/186* (2020.01); *G06F 2212/45* (2013.01); *G06Q 20/108* (2013.01); *G06Q 20/12* (2013.01); *G06Q 20/32* (2013.01); *G06Q 30/0613* (2013.01)

(58) Field of Classification Search
CPC ...... G06F 8/70; G06F 16/9537; G06F 16/972; G06F 12/0846; G06F 12/0871; G06F 12/0875; G06F 16/172; G06F 2212/45; G06F 21/606; G06F 19/00; G06F 40/106; G06F 40/186; G06F 8/60; G06F 8/36; G06F 9/44526; G06F 8/20; G06F 12/0891; G06Q 30/016; G06Q 10/10; G06Q 20/18; G06Q 30/06; G06Q 40/123; G06Q 20/14; G06Q 20/20; G06Q 50/06; G06Q 20/00; G06Q 30/0613; G06Q 20/10; G06Q 20/3223; G06Q 20/32; G06Q 20/325; G06Q 20/322; G06Q 20/12; G06Q 20/047; G06Q 20/145; G06Q 20/102; G06Q 30/04; G06Q 40/00; G06Q 40/02; G06Q 20/042; G06Q 20/3221; G06Q 20/108; G06Q 20/22; G06Q 30/0222; G06Q 30/01; H04N 21/23106; H04L 67/34; H04L 41/5054; H04L 41/5051
See application file for complete search history.

(56) References Cited

U.S. PATENT DOCUMENTS

| | | | | |
|---|---|---|---|---|
| 7,698,398 | B1* | 4/2010 | Lai | G06Q 10/10 709/223 |
| 7,899,879 | B2* | 3/2011 | Broda | H04L 67/568 711/3 |
| 8,185,827 | B2* | 5/2012 | Appleyard | G06Q 10/00 715/751 |
| 8,375,068 | B1* | 2/2013 | Platt | G06Q 10/10 705/7.29 |
| 8,543,665 | B2* | 9/2013 | Ansari | H04L 63/02 709/219 |
| 8,548,909 | B1* | 10/2013 | Snow | G06F 16/986 715/201 |
| 8,577,989 | B2* | 11/2013 | Broda | G06F 16/248 709/227 |
| 8,818,758 | B1* | 8/2014 | Singh | G06Q 50/06 702/182 |
| 9,003,297 | B2* | 4/2015 | Pierce | G06Q 10/103 715/744 |
| 9,178,994 | B2* | 11/2015 | Tuchman | G06Q 30/0207 |
| 9,336,060 | B2* | 5/2016 | Nori | H04L 41/0806 |
| 9,338,167 | B2* | 5/2016 | Han | H04L 67/01 |
| 9,367,057 | B2* | 6/2016 | Phillips | G05B 15/02 |
| 9,544,388 | B1* | 1/2017 | Li | H04L 65/60 |
| 9,576,285 | B2* | 2/2017 | Zhou | G06Q 20/401 |
| 9,697,512 | B2* | 7/2017 | Pitroda | G06Q 20/32 |
| 9,946,632 | B1* | 4/2018 | Chopra | G06F 11/3672 |
| 10,007,767 | B1* | 6/2018 | Ahmed | H04L 63/08 |
| 10,389,602 | B2* | 8/2019 | Chang | H04L 41/5045 |
| 10,608,894 | B2* | 3/2020 | Newton | H04L 67/51 |
| 10,735,394 | B2* | 8/2020 | Gupta | H04L 63/0815 |
| 11,106,345 | B2* | 8/2021 | Shedigumme | G06F 3/04847 |
| 2003/0004746 | A1* | 1/2003 | Kheirolomoom | G06Q 10/10 717/104 |
| 2003/0055868 | A1* | 3/2003 | Fletcher | G06F 8/20 709/201 |
| 2003/0120593 | A1* | 6/2003 | Bansal | H04L 65/765 705/36 R |
| 2003/0221068 | A1* | 11/2003 | Tsuji | G06F 16/284 711/126 |
| 2004/0117224 | A1* | 6/2004 | Agarwal | G06Q 30/04 705/412 |
| 2004/0168031 | A1* | 8/2004 | Haskins | G06F 12/0804 711/136 |
| 2004/0205473 | A1* | 10/2004 | Fisher | H04L 63/083 715/255 |
| 2005/0221268 | A1* | 10/2005 | Chaar | G09B 7/02 434/350 |
| 2006/0041641 | A1* | 2/2006 | Breiter | G06F 9/5072 709/219 |
| 2006/0085500 | A1* | 4/2006 | Allamaraju | G06F 16/958 709/203 |
| 2007/0027740 | A1* | 2/2007 | Babu | G06Q 30/0633 705/26.8 |
| 2007/0105480 | A1 | 6/2007 | Hwang et al. | |
| 2007/0150480 | A1* | 6/2007 | Hwang | H04M 3/42161 |

(56) References Cited

U.S. PATENT DOCUMENTS

| | | | |
|---|---|---|---|
| 2007/0174390 A1* | 7/2007 | Silvain | G06Q 10/10 709/204 |
| 2007/0271517 A1 | 11/2007 | Finkelman et al. | |
| 2008/0109276 A1* | 5/2008 | Ionfrida | G06F 8/20 717/104 |
| 2008/0147671 A1* | 6/2008 | Simon | G06F 16/957 |
| 2008/0222630 A1* | 9/2008 | Taylor | G06Q 10/06 707/999.102 |
| 2008/0295164 A1* | 11/2008 | Steiner | H04L 63/10 726/14 |
| 2009/0172696 A1* | 7/2009 | Meliksetian | G06F 16/958 719/315 |
| 2009/0271372 A1* | 10/2009 | Fife | G06F 16/2452 |
| 2009/0271573 A1* | 10/2009 | Kannan | H04L 41/0253 711/129 |
| 2009/0300060 A1* | 12/2009 | Beringer | G06F 8/24 |
| 2010/0185928 A1* | 7/2010 | Mathew | G06F 16/9577 715/209 |
| 2010/0198649 A1* | 8/2010 | Appleyard | G06Q 10/10 715/744 |
| 2011/0107266 A1* | 5/2011 | Hegde | G06F 8/38 715/841 |
| 2011/0110364 A1* | 5/2011 | Fried | G06Q 30/02 370/352 |
| 2011/0119088 A1* | 5/2011 | Gunn | G16Z 99/00 705/3 |
| 2011/0153727 A1* | 6/2011 | Li | G06F 21/41 709/203 |
| 2011/0270749 A1* | 11/2011 | Bennett | G06Q 20/102 705/40 |
| 2012/0005584 A1* | 1/2012 | Seago | G06F 11/32 715/738 |
| 2012/0158821 A1* | 6/2012 | Barros | G06F 9/5055 707/769 |
| 2013/0145361 A1* | 6/2013 | Kaegi | G06F 9/445 717/176 |
| 2013/0179244 A1* | 7/2013 | Laffoon | G06Q 30/0185 705/26.61 |
| 2013/0262139 A1* | 10/2013 | Salahuddin | G16H 10/60 705/2 |
| 2013/0332354 A1* | 12/2013 | Rhee | G06Q 20/322 705/41 |
| 2013/0346302 A1* | 12/2013 | Purves | G06Q 20/102 705/40 |
| 2014/0006208 A1* | 1/2014 | Fuhge | G06Q 30/04 705/26.61 |
| 2014/0038550 A1* | 2/2014 | Hwang | G06Q 10/06 455/406 |
| 2014/0074490 A1* | 3/2014 | Kundu | G06Q 30/016 705/1.1 |
| 2014/0173594 A1* | 6/2014 | Ng | G06F 9/505 718/1 |
| 2014/0201017 A1* | 7/2014 | Catalano | G06Q 30/0603 705/26.1 |
| 2014/0257935 A1* | 9/2014 | Killoh | G06Q 30/0276 705/7.35 |
| 2014/0278623 A1* | 9/2014 | Martinez | G06Q 10/06 705/7.12 |
| 2015/0039682 A1* | 2/2015 | Chasman | H04L 67/01 709/203 |
| 2015/0186855 A1* | 7/2015 | Bennett | G06Q 20/102 705/40 |
| 2015/0199311 A1* | 7/2015 | Charbonneau | G06Q 30/00 715/234 |
| 2015/0201037 A1* | 7/2015 | Buehler | G06F 16/972 707/756 |
| 2015/0249667 A1* | 9/2015 | Han | H04L 63/10 726/4 |
| 2015/0254617 A1* | 9/2015 | Rodriguez | G06Q 20/102 705/7.26 |
| 2016/0019636 A1* | 1/2016 | Adapalli | H04L 67/10 705/26.81 |
| 2016/0062903 A1* | 3/2016 | Gao | G06F 12/0891 711/133 |
| 2016/0063191 A1* | 3/2016 | Vesto | G06F 19/324 705/2 |
| 2016/0124742 A1* | 5/2016 | Rangasamy | G06F 8/70 717/103 |
| 2016/0127454 A1* | 5/2016 | Maheshwari | H04L 67/1097 709/223 |
| 2016/0335454 A1* | 11/2016 | Choe | G06Q 30/018 |
| 2017/0048319 A1* | 2/2017 | Straub | G06F 16/9574 |
| 2017/0126787 A1* | 5/2017 | Martinez | G06Q 10/06 |
| 2017/0134381 A1* | 5/2017 | Abdelhamed | H04L 63/10 |
| 2017/0250853 A1* | 8/2017 | Evans | H04L 63/0281 |
| 2018/0027006 A1* | 1/2018 | Zimmermann | G06F 21/6218 726/11 |
| 2019/0312773 A1* | 10/2019 | Bush | H04L 41/0806 |
| 2020/0244638 A1* | 7/2020 | Gupta | G06F 9/50 |
| 2022/0103695 A1* | 3/2022 | Mathiyalagan | H04M 15/51 |

OTHER PUBLICATIONS

Lars Brinkhoff, Retrocomputing, Stack Exchange, "What is the history and development of memory caching?" (Year: 2022).*
US 2007/0150480 A1 (Hwang et al.) Jun. 28, 2007.
US 2003/0120593 A1 (Bansal et al.) Jun. 26, 2003.
US 2007/0271517 A1 (Finkelman et al.) Nov. 22, 2007 A.
International Search Report.
Written Opinion and International Search Report dated Jul. 26, 2017 in International Application No. PCT/AU2017/050520.

* cited by examiner

CUSTOMER SERVICE SYSTEMS AND PORTALS

TECHNICAL FIELD

The disclosure relates to computer-implemented customer service systems, methods, portals and user interfaces. In particular, the disclosure relates to computer-implemented customer self-service systems, methods, portals and user interfaces, which may be used for utilities, such as electricity, gas and water, and taxation agencies, for example.

BACKGROUND

In utility industries, customer self-service portals may be provided by utility retailers to allow payment of bills and management of users' utility accounts. Many of the portal systems on the market are point solutions specific to a utility retailer and are built around the utility retailer's backend systems. This often creates a risk of unauthorised external access to the backend systems and databases.

In the tax industry, customer self-service portals may be provided to allow businesses and individual tax payers to manage their tax. This may include, for example, government tax registration, enquiries and payments. These portals may create a risk of unauthorised external access to the government backend systems and databases.

Many of the portals on the market have a bill payment page from which details can be entered and a bill can be paid. However, it is often difficult or unintuitive for a user to find the bill payment page and complete a payment.

There is a desire to provide computer-implemented customer self-service systems, methods, portals and/or user interfaces that address or ameliorate problems or shortcomings associated with previous portals and/or to at least provide a useful alternative thereto.

SUMMARY

Some embodiments of the disclosure provide a deployable customer self-service (CSS) system comprising:
  a user interface;
  a web portal configured to load and display the user interface;
  a service configured to provide data to the user interface based on a system of record or third party service; and
  an integration connector for connecting the service to the system of record or third party service such that the service is agnostic to the format of the system of record or third party service.

The deployable CSS system may comprise a plurality of user interfaces, and the web portal may be configured to selectively load and display the user interfaces.

The deployable CSS system may comprise a plurality of services, and the services may be selectively loaded to provide data to a selected user interface based on the system of record or third party service.

The deployable CSS system may comprise one or more base web portals, base user interfaces and/or base services.

The deployable CSS system may comprise one or more web portals, user interfaces and/or services that extend the base web portals, base user interfaces and/or base services for the deployment.

The deployable CSS system may comprise one or more closed modules comprising one or more web portals, user interfaces and/or services that extend the base web portals, base user interfaces and/or base services for the deployment.

The deployable CSS system may comprise a plurality of integration connectors that convert one or more formats used by the system of record or third party service to a standard format used by the service(s).

The integration connectors may communicate with the services via a standard protocol and/or in a standard format.

The integration connectors may comprise one or more drivers selectable based on the system of record or third party service to interface between the services and the system of record or third party service.

The deployable CSS system may comprise a plurality of portals, such as an end user portal to be accessed by an end user and a system administration portal to be accessed by a company.

The user interface(s), the web portal(s), the service(s) and the integration connector(s) may be closed modules that are not editable upon deployment.

The services may include a caching service that controls retrieval of data from the system of record or third party service and a database to store cached data.

The caching service may include configuration rules defining caching priorities for one or more categories of data. For example, the configuration rules may be specified in a configuration table.

The one or more categories of data may include a first category of data that is required in real time, a second category of data that is required as soon as possible, and a third category of data that is cached periodically.

The caching service may be configured to retrieve data in the first category of data for the user interface or service from the system of record or third party service.

The caching service may be configured to retrieve data in the second or third category of data for the user interface or service from the database.

The deployable CSS system may invalidate one or more categories of data. The caching service may be configured to retrieve data in an invalidated category of data for the user interface or service from the system of record or third party service.

Some embodiments of the disclosure provide a deployed CSS system comprising:
  a user interface;
  a web portal configured to load and display the user interface;
  a service configured to provide data to the user interface based on a system of record or third party service;
  an integration connector selected based on the system of record or third party service to interface between the service and the system of record or third party service such that the service is agnostic to the format of the system of record or third party service.

The user interface, the web portal, the service and the integration connector may be closed modules that are not editable.

Some embodiments of the disclosure provide a computer-implemented method for deploying a deployable CSS system, the deployable CSS system comprising:
  a user interface;
  a web portal configured to load and display the user interface;
  a service configured to provide data to the user interface based on a system of record or third party service; and
  one or more integration connectors for connecting the service to specific types of system of record or third party service such that the service is agnostic to the format of the system of record or third party service; the method comprising:

receiving, from a computing device, specifications of the system of record or third party service;

selecting an integration connector specific to the system of record or third party service to interface between the system of record or third party service and the service; and deploying the deployable CSS system with the selected integration connector to a data centre.

The computer-implemented method may comprise selecting one or more industry specific closed modules to be deployed as part of the CSS system, where the industry specific closed modules comprise one or more user interfaces, web portals and/or services.

The one or more industry specific modules may be selected based on an identifier of an industry received from the computing device.

Some embodiments of the disclosure provide a deployable customer self-service (CSS) system comprising a user interface, a service, and an integration connector for connecting the service to a system of record such that the service is agnostic to the format of the system of record, wherein the service is configured to:

receive usage data associated with sites in an area from the system of record via the integration connector;

determine a usage for a specified site based on the usage data;

determine an average usage for the sites in the area based on the usage data; and display, in the user interface, a site usage identifier identifying the usage for the specified site and an average area usage identifier identifying the average usage for the sites in the area.

The site usage identifier and the average area usage identifier may be coloured according to a level of usage.

The usage for the specified site and the average usage for the sites in the area may be determined according to a billing period of a user at the specified site.

The user interface may comprise a map and a location identifier that identifies a location of the specified site on the map. The location identifier may be coloured according to a level of usage for the specified site.

Some embodiments of the disclosure provide a method comprising:

receiving, via a communications network from a computing device, a request to access a CSS portal;

transmitting, via the communications network to the computing device, a user interface to display on the first computing device, the user interface comprising a payment button located at a fixed location at a right side of the user interface;

receiving, via the communications network from the computing device, a request based on an actuation of the payment button; and transmitting, via the communications network to the computing device, a second user interface to facilitate making a payment.

The method may comprise receiving, via the communications network from the computing device, a request to view a second user interface; and transmitting, via the communications network to the computing device, the second user interface to display on the first computing device, the second user interface comprising the payment button located at the fixed location at the right side of the second user interface.

The fixed location may be a fixed location in a window or a fixed location on the screen. The payment button may stay located at the fixed location in the window or on the screen when scrolling. The payment button may form part of a payment division that stays located at the fixed location. The division may display a payment amount with the payment button.

The term "system of record" as used herein refers to an information storage system that is an authoritative data source for a given data element or piece of information.

The term "button" as used herein may refer to any element of a graphical user interface which a user can select, for example, via a mouse or touchscreen, to perform a particular action.

DESCRIPTION OF EMBODIMENTS

Embodiments of customer self-service (CSS) system described herein may connect to a company backend system, for example, to allow a customer to perform actions and view data in relation to the company. In one example, the CSS system may connect to a utility company backend system, for example, to allow a customer to perform actions and view data in relation to utilities provided by the utility company. In one example, the CSS system may connect to a government backend system, for example, to allow a customer to perform actions and view data in relation to tax provided by a taxation agency. The CSS system may be agnostic of the company backend system to which it connects allowing the CSS system to be deployed to connect with a range of different backend systems. This may be achieved, for example, by providing a closed system and by selecting specific drivers to integrate the closed system with specific backend systems and/or providing a plugin framework that may connect the closed system with various backend systems, such as a customer information system (CIS), a meter data management system (MDMS) and a network management system (NMS) for utility related applications, or a public service revenue management system (PSRM) for tax related applications.

Figure 1:
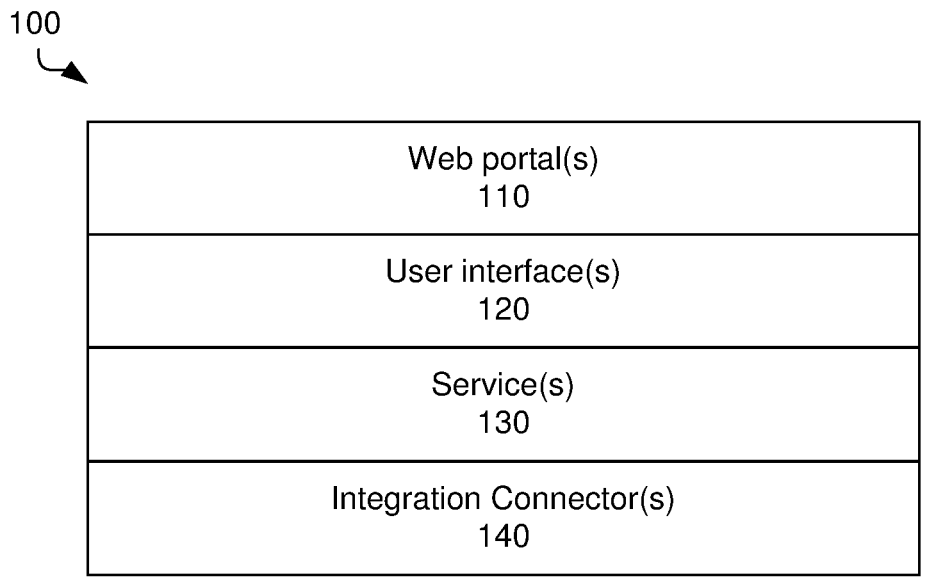
FIG. 1 illustrates a deployable CSS system.

FIG. 1 illustrates a deployable CSS system 100. The deployable CSS system 100 comprises one or more web portals 110, one or more user interfaces 120, one or more services 130 and one or more integration connectors 140.

The one or more web portals 110 are configured to load and display the one or more user interfaces 120. The one or more services 130 are configured to provide data to the one or more user interfaces 120 based on one or more systems of record and/or third party services. The one or more integration connectors 140 are for connecting the services to the one or more systems of record and/or third party services. The one or more services 130 are agnostic to the formats of the one or more systems of record and/or third party services.

Each web portal 110 may be configured to selectively load and display the one or more user interfaces 120, for example, based on the actions of a user. The one or more services 130 may be selectively loaded to provide data to a selected user interface 120 based on the system of record or third party service. The integration connectors 140 may communicate with the one or more services 130 via a standard protocol and/or in a standard format.

The integration connectors 140 may comprise a plurality of drivers or plugins. During deployment, one or more drivers may be selected based on the system of record or third party service to interface between one or more of the services 130 and the system of record or third party service. For example, the one or more drivers may be selected to convert from a protocol and/or format used by the system of record or third party service to the standard protocol and/or the standard format of the services 130.

The one or more web portals 110 may include an end user portal to be accessed by an end user, a utility administration portal to be accessed by a utility company, and/or a user administration portal to be accessed by a system administrator.

The user interface(s), the web portal(s), the service(s) and the integration connector(s) may be closed modules that are not editable upon deployment. This may prevent unauthorised access to the system(s) of record and/or the third service(s) via the one or more web portals 110 by isolating the system of record(s) and/or the third party service(s) from the web portal(s) 110.

Figure 2:
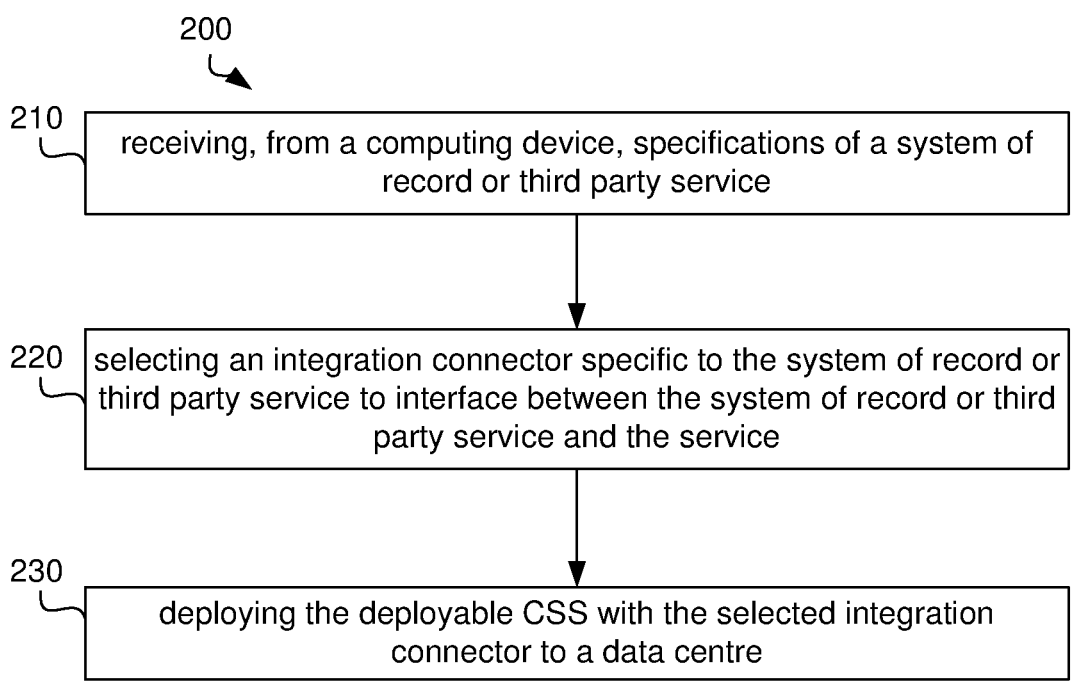
FIG. 2 illustrates a computer-implemented method for deploying the deployable CSS system.

FIG. 2 illustrates a computer-implemented method 200 for deploying the deployable CSS system 100. At 210, the method 200 comprises receiving, from a computing device, specifications of the system of record or third party service. The specifications may include, for example, an application program interface (API) used to maintain or access the system of record or the third service, a protocol (e.g. Simple Object Access Protocol (SOAP) over Hypertext Transfer Protocol Secure (HTTPS)) used to access the system of record or third party service, or a format of the system of record or third party service.

At 220, the method 200 comprises selecting an integration connector specific to the system of record or third party service to interface between the system of record or third party service and the services. For example, a server may store associations between specifications for systems of record or third party services and drivers, and may select the driver specific to the system of record or third party service based on the stored associations.

At 230, the method 200 comprises deploying the deployable CSS system with the integration connector to a data centre. The data centre may be a data centre that is also used to store the system of record or may be a separate data centre such as a cloud data centre.

For example, in a deployment such as a utilities related deployment, the integration connectors may connect the services to Meter Data Management Systems (MDMS), such as EnergyIP™ and Itron™, Retail Billing Systems, such as Gentrack Velocity™, SAP and Oracle™ Customer Care and Billing (CC&B), Ticketing and Case Management Systems, such as Zendesk™, and/or Content Management Systems (CMS), such as Sharepoint™ and Sitecore™.

The deployable CSS system may be deployed using OutSystems rapid application development platform utilising ASP.NET and Oracle database technologies. During deployment, a utility company may be able to select between two platform as a service (PaaS) implementation options: onsite deployment using the utility provider's infrastructure; or hosted deployment using a cloud environment.

The OutSystems platform contains a rich set of industry standard adaptor technologies that facilitate seamless integration of many other application interfaces. The selectable integration connectors may include drivers that allow the deployable CSS to connect to various mission critical applications such as Oracle CC&B, SAP and Gentrack.

Using an OutSystems Cloud Platform, instances of the deployable CSS may be created that have the same code base. These instances may run seamlessly on a range of devices and form factors, such as desktop computers, notebooks, tablets, and mobile phones. That is, the instances may be deployed to run natively and display user interfaces correctly on such devices and form factors. The instance may also be accessible via a range of browsers such as Google Chrome™ 23 or newer, Internet Explorer 9 or newer, Mozilla Firefox 17 or newer and Safari 6 or newer.

In some embodiments, the integration connectors include pre-built connectors that can be leveraged to integrate with enterprise backend systems, such as those provided by Oracle CC&B.

Figure 3:
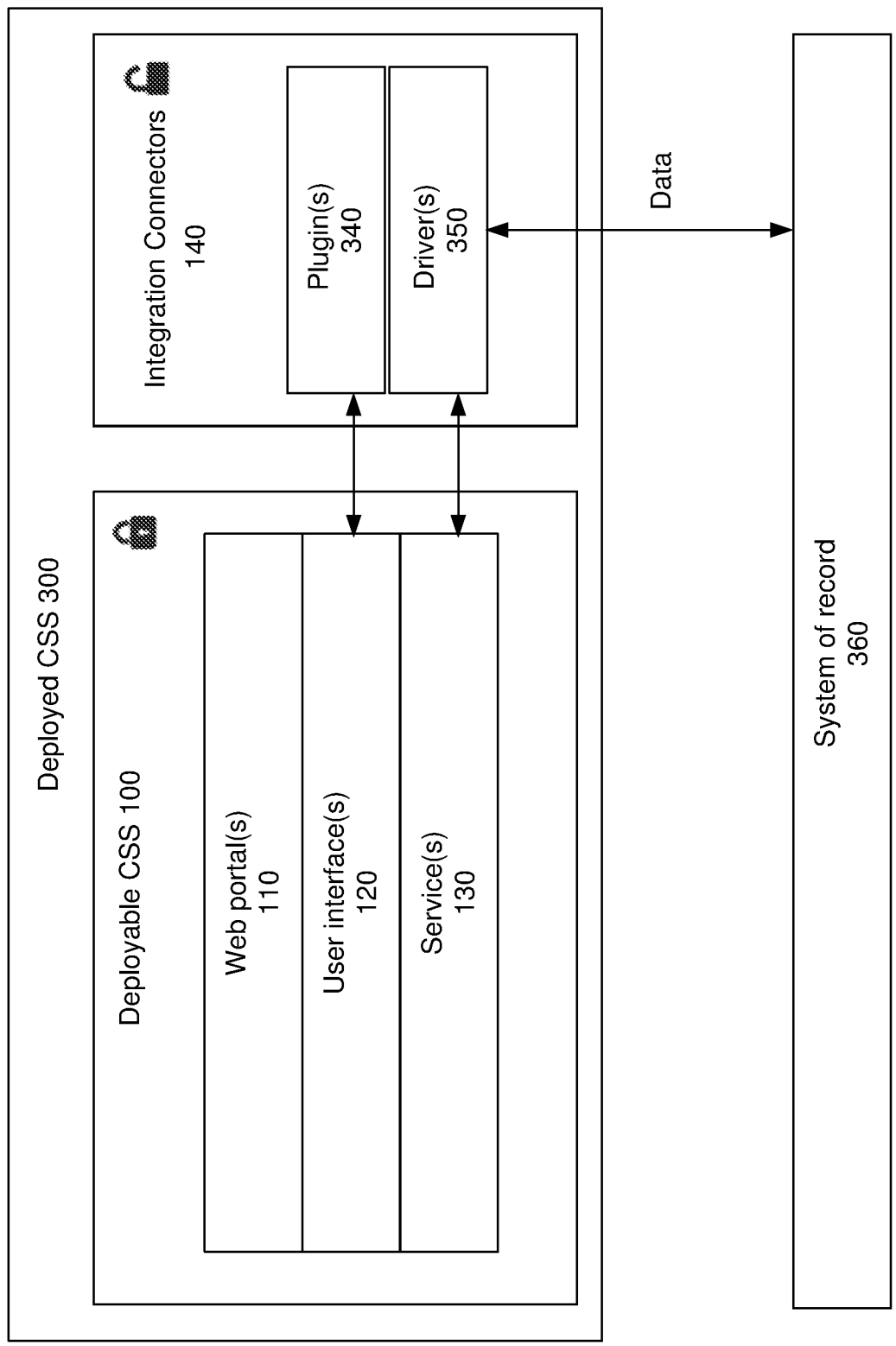
FIG. 3 illustrates an overview of a deployed CSS system.

FIG. 3 illustrates an overview of a deployed CSS system 300 comprising an instance of the deployable CSS 100 which comprises the web portal(s) 110, the user interface(s) 120, the service(s) 130 and the integration connector(s) 140. The integration connector(s) 140 comprise one or more drivers 350 selected based on the system of record 360 to interface between the service(s) 130 and the system of record 360. The integration connector(s) 140 may also comprise one or more plugins 340 selected to customise the functionality of the deployed CSS 300. The driver(s) 350 and/or plugin(s) 340 may be selected to customise the system 300, for example, per installation, business or region.

The deployable CSS 100 may be deployed as closed code that is not editable. For example, the web portal(s) 110, the user interface(s) 120 and the service(s) 130 may be closed modules that are not editable. The driver(s) 350 and/or plugin(s) 340 may also be closed modules that are selectable during deployment to customise the deployed CSS 300, but are not editable.

Figure 3A:
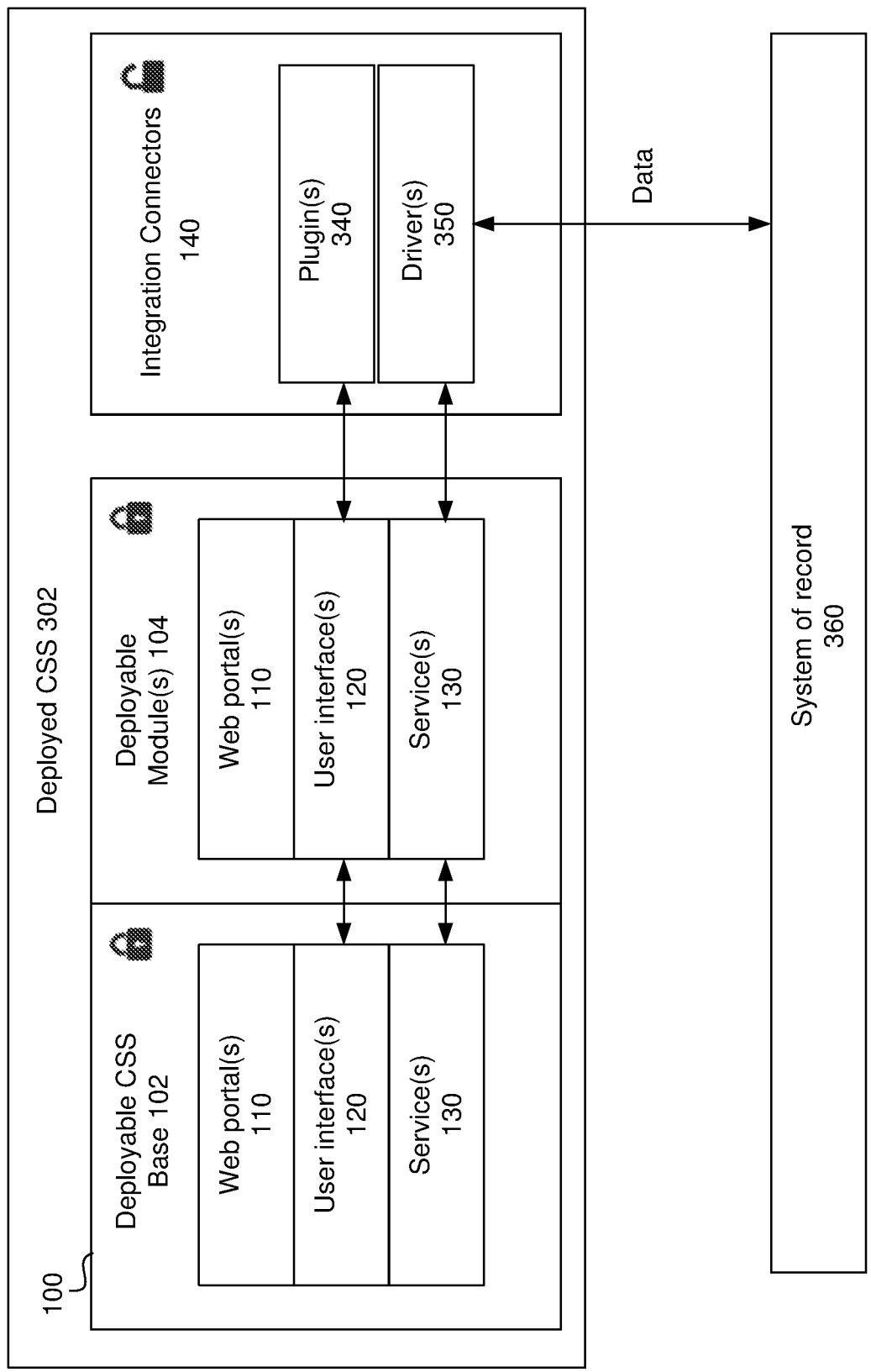
FIG. 3a illustrates an overview of a deployed CSS system including a base and one or more modules.

FIG. 3a illustrates an overview of a deployed CSS system 302 comprising an instance of a deployable CSS base 102, an instance of one or more deployable CSS modules 104, and one or more integration connectors 140. The deployable CSS base 102 comprises web portal(s) 110, user interface(s) 120 and/or service(s) 130, which constitute a base set of components for the deployable CSS 100. The deployable CSS module(s) 104 comprises web portal(s) 110, user interface(s) 120 and/or service(s) 130, which constitute a custom selection of components specific to the application for which the CSS system 302 is deployed. The integration connector(s) 140 comprise one or more drivers 350 selected based on the system of record 360 to interface between the service(s) 130, of the deployable CSS base 102 and the deployable CSS module(s), and the system of record 360. The integration connector(s) 140 may also comprise one or more plugins 340 selected to customise the functionality of the deployed CSS 302. The deployable CSS module(s), driver(s) 350 and/or plugin(s) 340 may be selected to customise the system 302, for example, per installation, business or region.

The deployable CSS base 102 and/or the deployable CSS module(s) 104 may be deployed as closed code that is not editable. For example, the web portal(s) 110, the user interface(s) 120 and the service(s) 130, of the deployable CSS base 102 and the deployable CSS module(s) 104, may be closed modules that are not editable. The deployable CSS module(s) 104, driver(s) 350 and/or plugin(s) may also be closed modules that are selectable during deployment to customize the deployed CSS 302, but are not editable.

Figure 4:
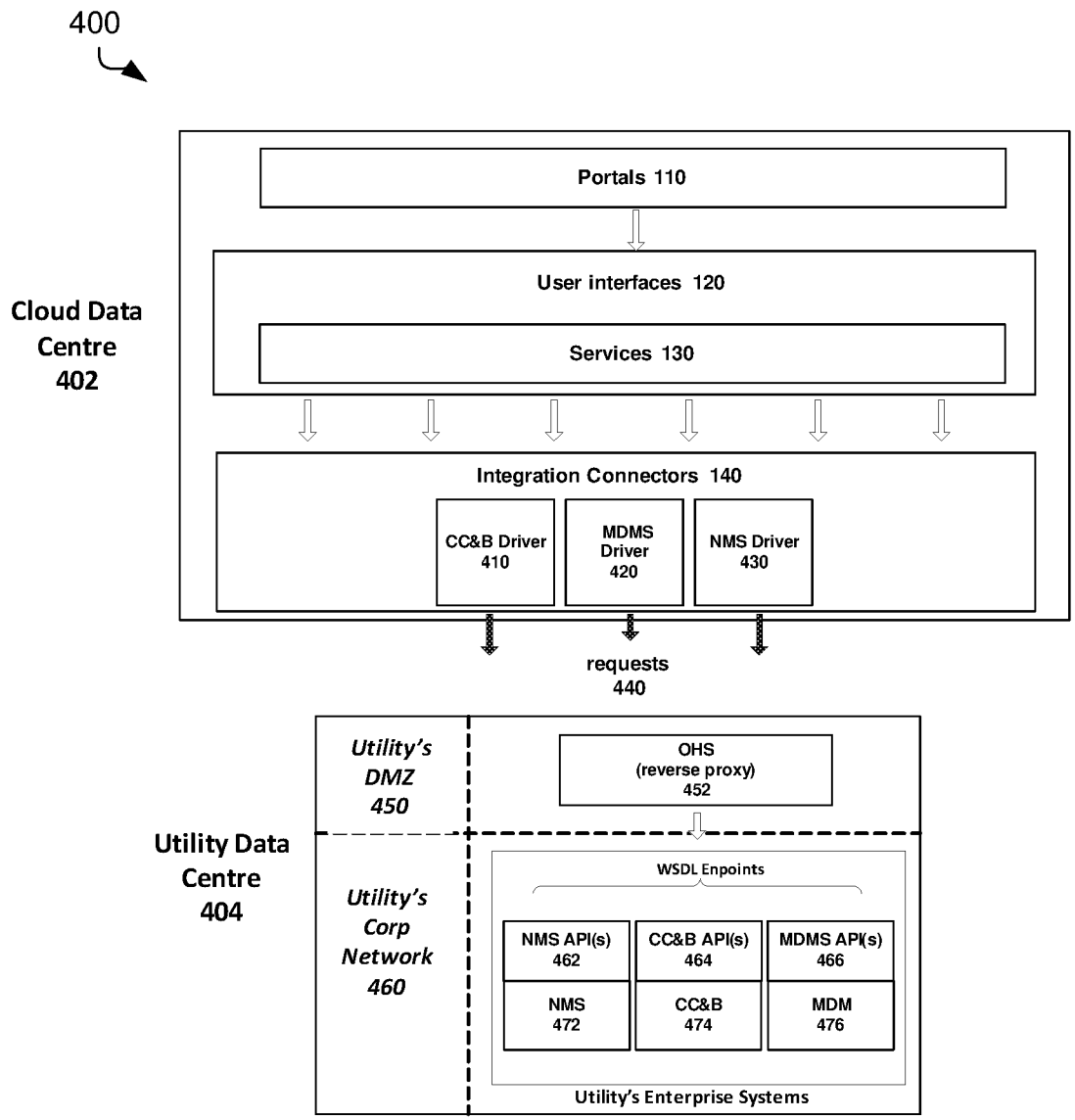
FIG. 4 illustrates a first example deployed CSS system that has been deployed in a cloud data centre and interacts with a utility data centre.

FIG. 4 illustrates a first example deployed CSS system 400 that has been deployed in a cloud data centre 402, such as an Amazon Web Services (AWS) data centre. The portals 110 can be accessed from the cloud data centre via the Internet to display the user interfaces 120 on a computing device. The services 130 associated with the user interfaces 120 request data via the integration connectors 140.

The integration connectors 140 comprise a customer care and billing (CC&B) driver 410, a meter data and management service (MDMS) driver 420, and a network management system (NMS) driver 430. The integration connectors 140 send requests 440 to a utility data centre 404. The utility data centre comprises a demilitarised zone (DMZ) 450 including an hypertext transfer protocol (HTTP) server or reverse proxy 452. The DMZ may be used to isolate service(s) that are provided to external networks from the utility's corporate network. The HTTP server issues requests to web service definition language (WSDL) endpoints in the utility's corporate network 460. The WSDL endpoints include an NMS API 462 to retrieve data from an NMS 472, a CC&B API 464 to retrieve data from a CC&B system 474, and an MDMS API 466 to retrieve data from an MDMS 476.

For example, the utility data centre 404 may be an Oracle based system comprising an Oracle HTTP server (OHS), an Oracle NMS API 462 to retrieve data from an Oracle NMS 472, an Oracle CC&B API 464 to retrieve data from an Oracle CC&B system 474, and an Oracle MDMS API 466 to retrieve data from an Oracle MDMS 476. The integration connectors 140 may then comprise an Oracle CC&B driver 410, an Oracle MDMS driver 420 and an Oracle NMS driver 430.

Figure 4A:
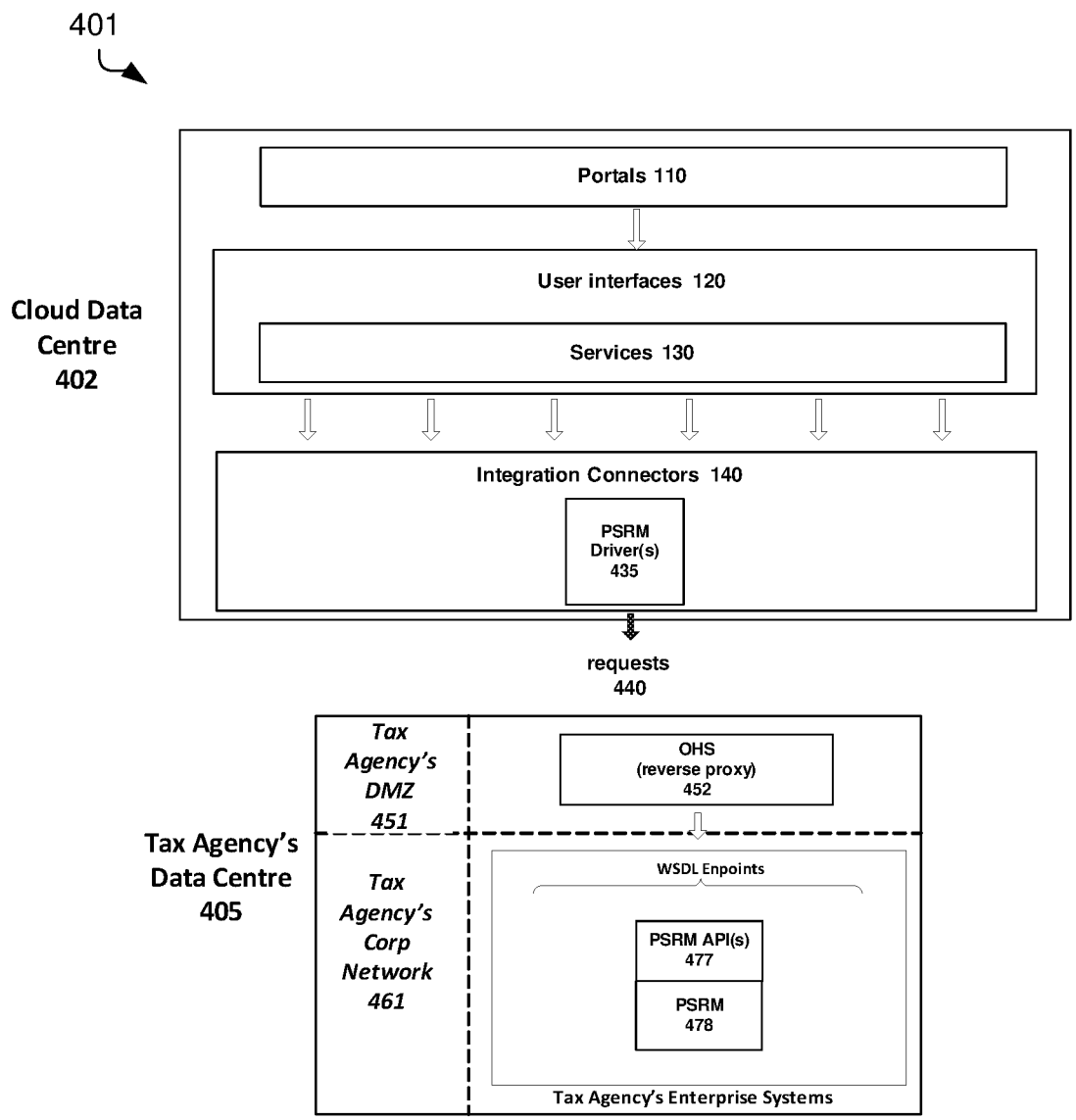
FIG. 4a illustrates a second example deployed CSS system that has been deployed in a cloud data centre and interacts with a tax agency's data centre.

FIG. 4a illustrates second example deployed CSS system 401, wherein the integration connector(s) 140 comprise a public service revenue management system (PSRM) driver 435. The integration connector(s) 140 send requests 440 to a tax agency's data centre 405. The tax agency's data centre 405 comprises a demilitarised zone (DMZ) 451 including an hypertext transfer protocol (HTTP) server or reverse proxy 452. The HTTP server 452 issues requests to web service definition language (WSDL) endpoints in the tax agency's corporate network 461. The WSDL endpoints include a PSRM API 477 to retrieve data from a PSRM 478.

For example, the tax agency's data centre 405 may include an Oracle based system comprising an Oracle HTTP server (OHS) and an Oracle PSRM API 477 to retrieve data from an Oracle PSRM 488. The integration connectors 140 may then comprise an Oracle PSRM driver 435.

Figure 5:
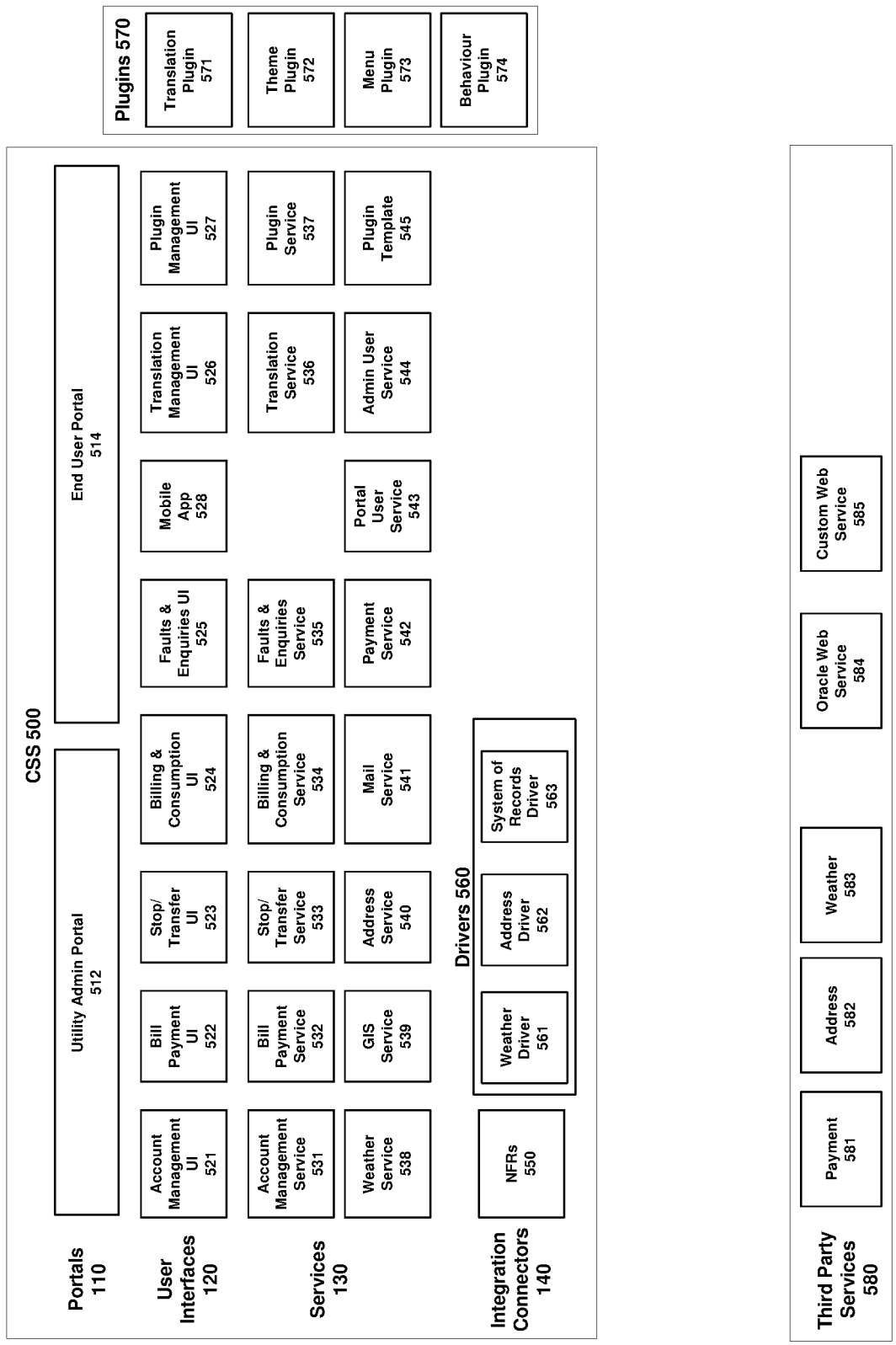
FIG. 5 illustrates a third example deployed CSS system for a utility application.

FIG. 5 illustrates a third example deployed CSS system 500 for a utility related application. The deployed CSS system 500 comprises web portals 110, user interfaces 120, services 130 and integration connectors 140 which include drivers 560. The web portals 110 comprise an end user portal 514 and a utility administration portal 512. The user interfaces 120 comprise an account management user interface 521, a bill payment user interface 522, a stop/transfer user interface 523, a billing and consumption user interface 524, a faults and enquiries user interface 525, a translation management user interface 526 and a plugin management user interface 527. The user interfaces 120 may also comprise a mobile app 528 which can be downloaded to a mobile computing device to interact with the deployed CSS system 500. The user interfaces 120 may be loaded selectively into the portals 110. Third party services 580 may include: payment gateways 581, address verification service 582 to validate addresses, weather service 583 to retrieve historical weather data for a given location, Oracle CSS Web services 584, and one or more custom web service 585.

The services 130 comprise an account management service 531, a bill payment service 532, a stop/transfer request service 533, a billing and consumption service 534, a faults and enquiries service 535, a translation service 536, a plugin service 537, a weather service 538, a geographic information system (GIS) service 539, an address service 540, a mail service 541, a payment service 542, a portal user service 543 and an administrator user service 544. The account management service 531 manages end user registration, user security, user profile maintenance, account linkages, and utility administration user management. The bill payment service 532 manages aspects of bill payments including once off payments, regular auto payments and bill smoothing. The stop/transfer request service 533 manages requests from end users to either stop a service associated with their address or transfer one or more services to a new service address. The billing and consumption service 534 provides billing and consumption information to the billing and consumption user interface 524. The faults and enquiries service 535 enables end users to log faults/enquiries or outage requests with the utilities provider. The translation service 536 manages translation of data into different languages for the user interfaces 120.

The weather service 538 retrieves historical weather information from one or more weather providers which may then be utilised by the end user portal 514 for various capabilities, such as providing weather overlays on usage or billing history graphs in the billing and consumption user interface 524. The GIS service 539 retrieves geospatial information from one or more GIS providers which may then be utilised by the end user portal 514 for various capabilities, such as displaying locations of outages on a map in the faults and enquiries user interface 525. The address service 540 retrieves and validate addresses from one or more address verification providers which may then be utilised by the end user portal 514 for various capabilities, such as auto completion and validation of address for transfer of services via the stop/transfer user interface. The mail service 541 compiles email messages based on workflow actions within the deployed CSS system 500, and sends email notifications to respective end users. The payment service 542 manages interactions with third party payment gateways 581, for example, to execute bill payments. The portal user service 543 manages users for the end user portal 514, such as during registration with the portal and login to the portal. The administrator user service 544 manages users for the utility administration portal 514

The plugin service 537 manages plugins 570 that can be selected specific to the deployment to extend the CSS system 500. A plugin template 545 is provided which may specify a required format or syntax for the plugins. The plugins 570 shown include a translation plugin 571 to extend the translation service, a theme plugin 572 to theme the user interfaces 120, a menu plugin 573 to provide or extend a menu in the end user portal 514, and a behaviour plugin 574 to define one or more behaviours of the user interfaces 120.

The integration connectors 140 include non-functional requirements (NFRs) 550 and a set of drivers 560 that can be selected specific to the deployment. A weather driver 561 connects to a third party weather service 583 to retrieve historical weather data for a given location. An address driver 562 connects to a third party address verification service 582 to validate addresses. A system of record driver 563 connects to the customer's back end system web services, for example, Oracle CSS Web services 584, to receive data from a system of record, such as usage history or billing history.

The NFRs 550 and other integration connectors 140 provide integration to deployment specific applications or connect to third party APIs to connect to these applications. For example, the integration connectors 140 may interface with backend systems of a utility provider by using specific APIs and translating data into a common information model as required by the services 130. The integration connectors 140 may provide messaging and routing components and manage data flows between the services 130, components and backend enterprise systems or third party systems.

Figure 6:
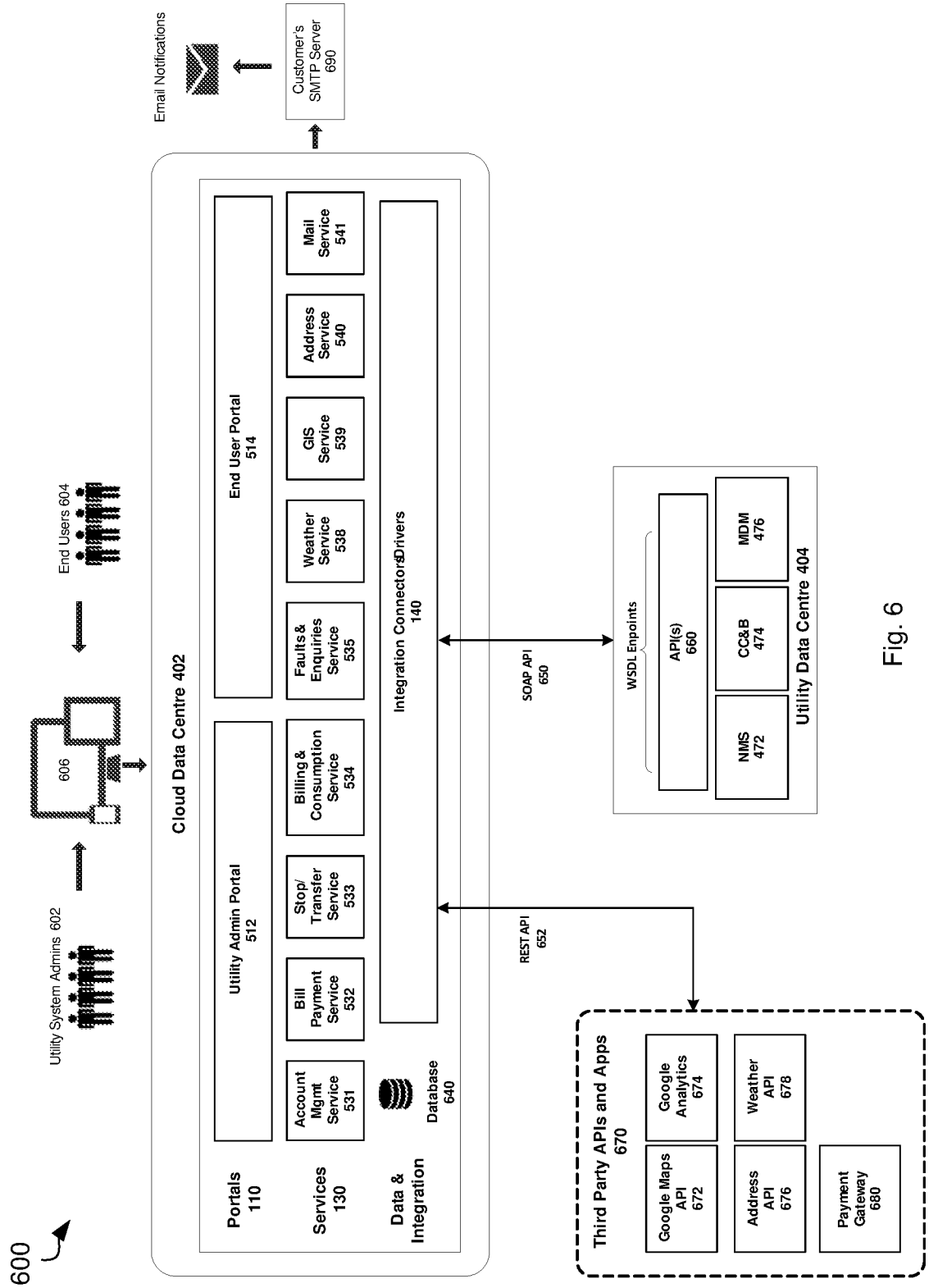
FIG. 6 illustrates a fourth example deployed CSS system that has been deployed in a cloud data centre for a utility application.

FIG. 6 illustrates a fourth example deployed CSS system 600 for a utility related application. The deployed CSS system 600 is deployed in a cloud data centre 402. The one or more integration connectors 140 receive data from a utility data centre 404, and/or one or more third party application programmable interfaces (APIs) or applications 670. For example, as shown, the one or more integration connectors 140 may include a SOAP API 650 to interface between the services 130 and the API(s) 660 of the utility data centre 404, and a Representational State Transfer (REST) API 652 to interface between the services 130 and the third party APIs or applications 670. For example, the API(s) 660 may include the NMS API 462, the CC&B API 464 and the MDMS API 466 shown in FIG. 4.

The third party APIs and applications 670 may be utilised by the system to deliver capabilities as required by the system 600. The third party APIs and applications 670 shown include a Google Maps™ API 672 which may be utilised by the service(s) 130 when displaying outage maps, a Google Analytics™ API 674 which may be used for tracking web analytics and usage in the portal(s) 110, an address auto completion and validation API 676 which may be used by the service(s) 130 when receiving addresses in the user interface(s), a weather API 678 which may be used to provide historical weather information to the service(s) 130, and a payment gateway 680 which may be used by the bill payment service 532 for bill payments. For example, the address auto completion and validation API 676 may be an API that is used to connect to SmartyStreets, the weather API 678 may be an API that is used to connect to OpenWeatherMap, and the payment gateway 680 may be an API that is used to connect to payeezy, eWay, PayPal™ or Authorize.net.

The one or more integration connectors 140 may also include OAuth connectors for third party authentication, such as Facebook™ connect and Google™ connect, and SMS gateway connectors, such as Twillio™.

The system 600 may comprise a database 640 to store some of the information received via the integration connectors 140. The database 640 typically will only contain minimal information and cached data, and most information used by the system will be stored and updated within the system(s) of record. For example, the database 640 may store details such as a user profile, linked account details and portal lookup data.

Utility system administrators 602 may use a computing device 606 to connect via the Internet to a utility administration portal 512 on cloud data centre 402. End users 604 may use a computing device 606 to connect via the Internet to an end user portal 514 on the cloud data centre 402. The mail service 541 may connect to an end user's or customer's SMTP server 690 to send email notifications to respective end users. For example, the email notifications may notify the end user(s) of outages or other issues in relation to the utility.

Figure 6A:
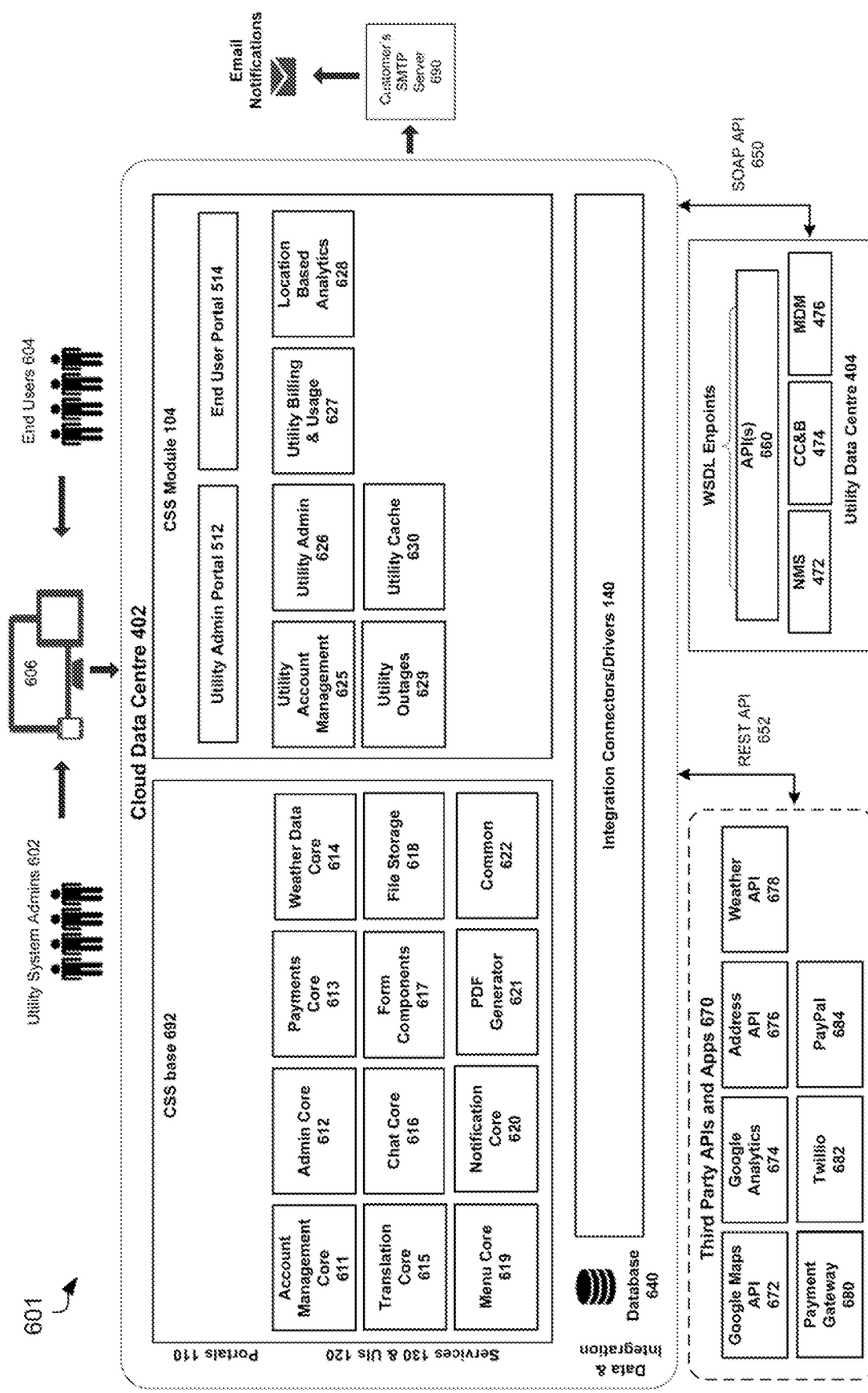
FIG. 6a illustrates a fifth example deployed CSS system that has been deployed in a cloud data centre for a utility application.

FIG. 6a illustrates a fifth example deployed CSS system 601 for a utility related application. The deployed CSS system 601 is deployed in a cloud data centre 402. The deployed CSS system 601 comprises a CSS base 692, a CSS module 104 and one or more integration connectors 140. The CSS base 692 may comprise one or more base components that may be used for a range of applications, deployments and/or industries. For example, the base components may comprise core or general user interfaces 120 and/or services 130. The CSS base 692 comprises an account management core component 611, an administration core component 612, a payments core component 613, a weather data core component 614, a translation core component 615, a chat core component 616, a form components component 617, a file storage component 618, a menu core component 619, a notification core component 620, a PDF generator component 621 and common components 622.

The CSS module 104 comprises a utility administration portal 512 and an end user portal 514. The CSS module 104 comprises additional components that may comprise interfaces 120 and/or services 130 that extend the base components for the deployment. The additional components may be stand alone or inherit functionality from one or more of the base components. The additional components include a utility account management component 625, a utility administration component 626, a utility billing and usage component 627, a location based analytics component 628, a utility outages component 629 and a utility cache component 630. The CSS module 104 may comprise portals 110 and components that customise the CSS base for a deployment or a type of deployment. In the example shown in FIG. 6a, the CSS module 104 is for utility related deployments. For example, the account management core component 611 may provide core account management functions and/or interfaces that may be used in different applications, and the utility account management component 625 may provide additional account management capabilities and/or interfaces that are specific to utility related deployments.

The one or more integration connectors 140 receive data from a utility data centre 404, and/or one or more third party application programmable interfaces (APIs) or applications 670. The third party APIs and applications 670 shown include a Google Maps™ API 672 which may be utilised by the service(s) 130 when displaying outage maps and location based analytics information, Google Analytics™ 674 which may be used for tracking web analytics and usage in the portal(s) 110, an address auto completion and validation API 676 which may be used by the service(s) 130 when receiving addresses in the user interface(s) 120, a weather API 678 which may be used to provide historical weather information to the service(s) 130, a payment gateway 680 and a PayPal payment gateway 684 which may be used by the payments core component 613 and the utility billing and usage component 627 for bill payments, and Twillio™ 682 which may be used by the utility outages component 629 to send SMS notifications for outages.

The system 601 may comprise a database 640 to store some of the information received via the integration connectors 140 as discussed above. Utility system administrators 602 may use a computing device 606 to connect via the Internet to a utility administration portal 512 on cloud data centre 402. End users 604 may use a computing device 606 to connect via the Internet to an end user portal 514 on the cloud data centre 402.

Figure 6B:
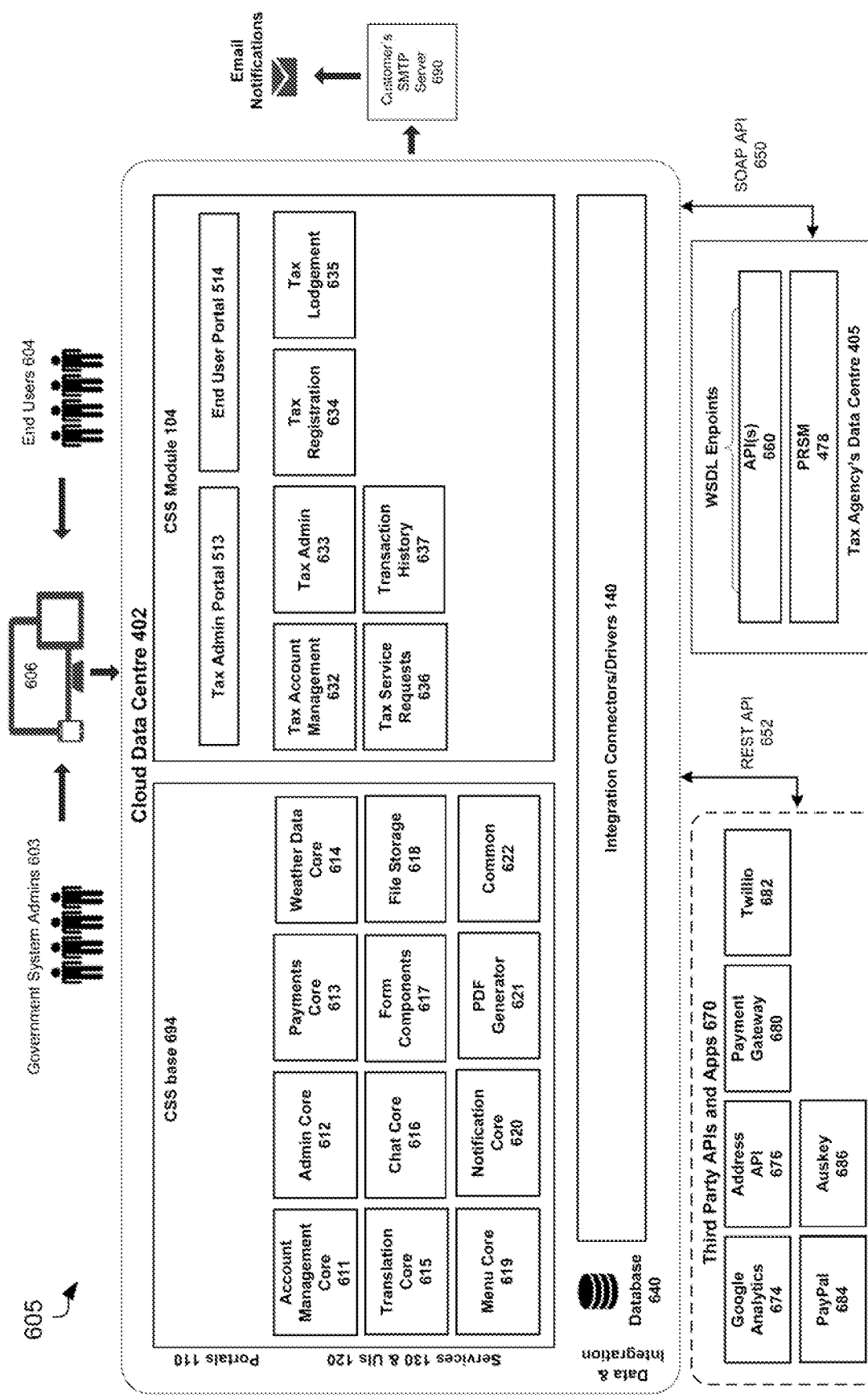
FIG. 6b illustrates a sixth example deployed CSS system that has been deployed in a cloud data centre for a tax application.

FIG. 6b illustrates a sixth example deployed CSS system 605 for tax related applications. The deployed CSS system 605 is deployed in a cloud data centre 402. The deployed CSS system 605 comprises a CSS base 694, a CSS module 104 and one or more integration connectors 140. The CSS base 694 comprises the same services 130 as in the fifth example deployed CSS system 601 in FIG. 6a.

The CSS module 104 may comprise portals 110 and components that customise the CSS base for a deployment, a type of deployment, or a specific industry. In the example shown in FIG. 6b, the CSS module 104 is for tax related deployments. The CSS module 104 comprises a tax administration portal 513 and an end user portal 514. The CSS module 104 comprises a tax account management component 632, a tax administration component 633, a tax registration component 634, a tax lodgement component 635, a tax service requests component 636 and a transaction history component 637.

The one or more integration connectors 140 receive data from a tax agency's data centre 405, and/or one or more third party application programmable interfaces (APIs) or applications 670. For example, as shown, the one or more integration connectors 140 may include a SOAP API 650 to interface between the services 130 and the API(s) 660 of the tax agency's data centre 405, and a Representational State Transfer (REST) API 652 to interface between the services 130 and the third party APIs or applications 670. For example, the API(s) 660 may include the PSRM API 478.

The third party APIs and applications 670 may be utilised by the system to deliver capabilities as required by the system 605. The third party APIs and applications 670 shown include Google Analytics™ 674 which may be used for tracking web analytics and usage in the portal(s) 110, an address auto completion and validation API 676 which may be used by the service(s) 130 when receiving addresses in the user interface(s) 120, a payment gateway 680 and a PayPal payment gateway 684 which may be used by the payments core component 613 and tax lodgement component 635 for tax lodgement, Twillio™ 682 which may be used by the services 130 to send SMS notifications regarding tax, and Auskey 686 that may be used for Single Sign On.

Government system administrations or tax system administrators 603 may use a computing device 606 to connect via the Internet to a tax administration portal 513 on cloud data centre 402. Tax payers 604 may use a computing device 606 to connect via the Internet to an end user portal 514 on the cloud data centre 402.

In some embodiments, the fifth example deployed CSS system 601 may be instead deployed in a utility data centre 404. In some embodiments, the sixth example deployed CSS system 605 may be instead deployed in a tax agency's data centre 405.

Figure 7:
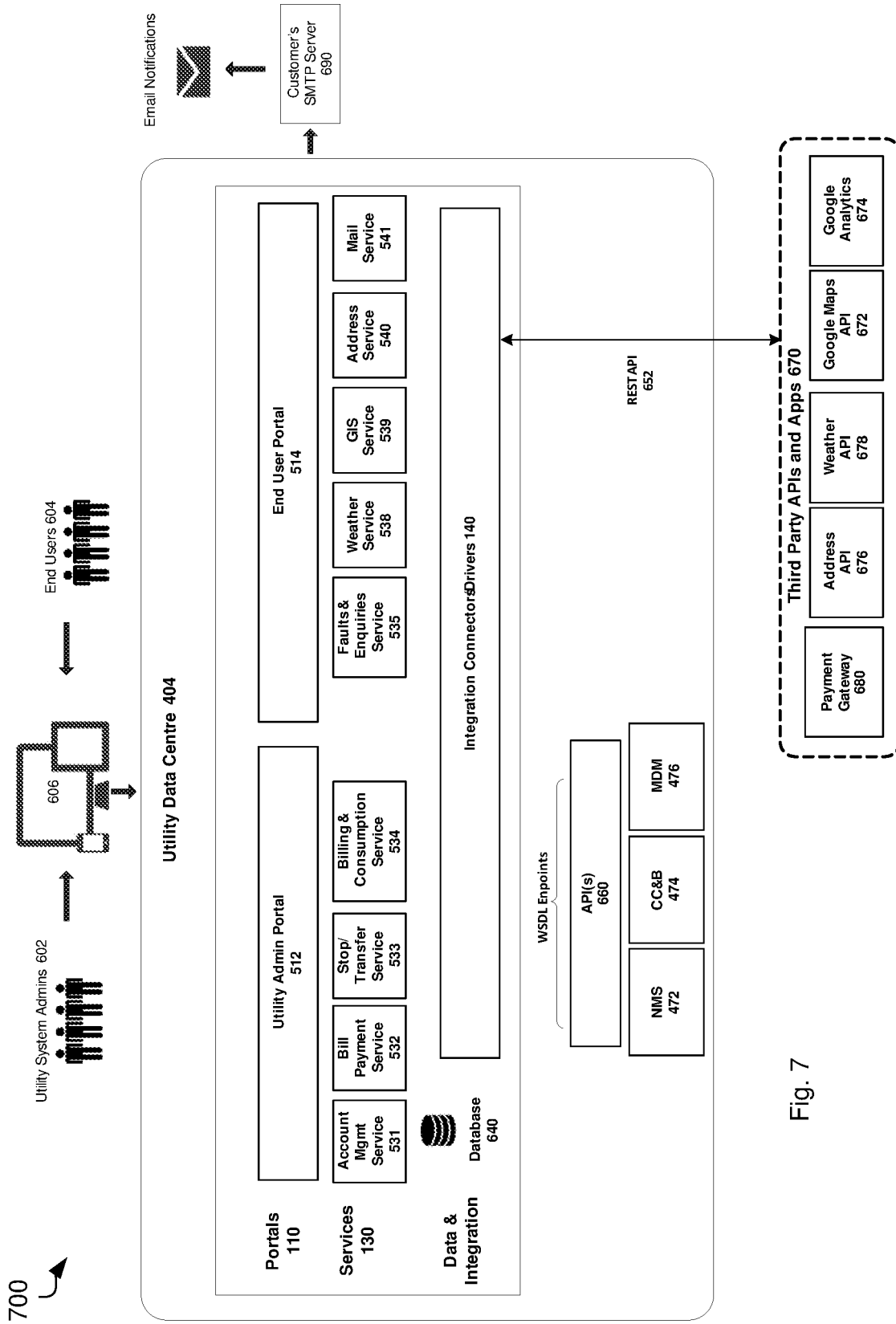
FIG. 7 illustrates a seventh example of a deployed CSS system that has been deployed in a utility data centre.

FIG. 7 illustrates a seventh example deployed CSS system 700. The deployed CSS system 700 is deployed in a utility data centre 404. The one or more integration connectors 140 receive data from within the utility data centre and from one or more third party application programmable interfaces (APIs) or applications 670 external to the utility data centre 404. For example, as shown, the one or more integration connectors 140 may include a REST API 652 to interface between the services 130 and the third party APIs or applications 670.

Utility system administrators 602 may use a computing device 606 to connect via the Internet to the utility administration portal 512 on utility data centre 404. End users 604 may use a computing device 606 to connect via the Internet to the end user portal 514 on the utility data centre 404.

Figure 8:
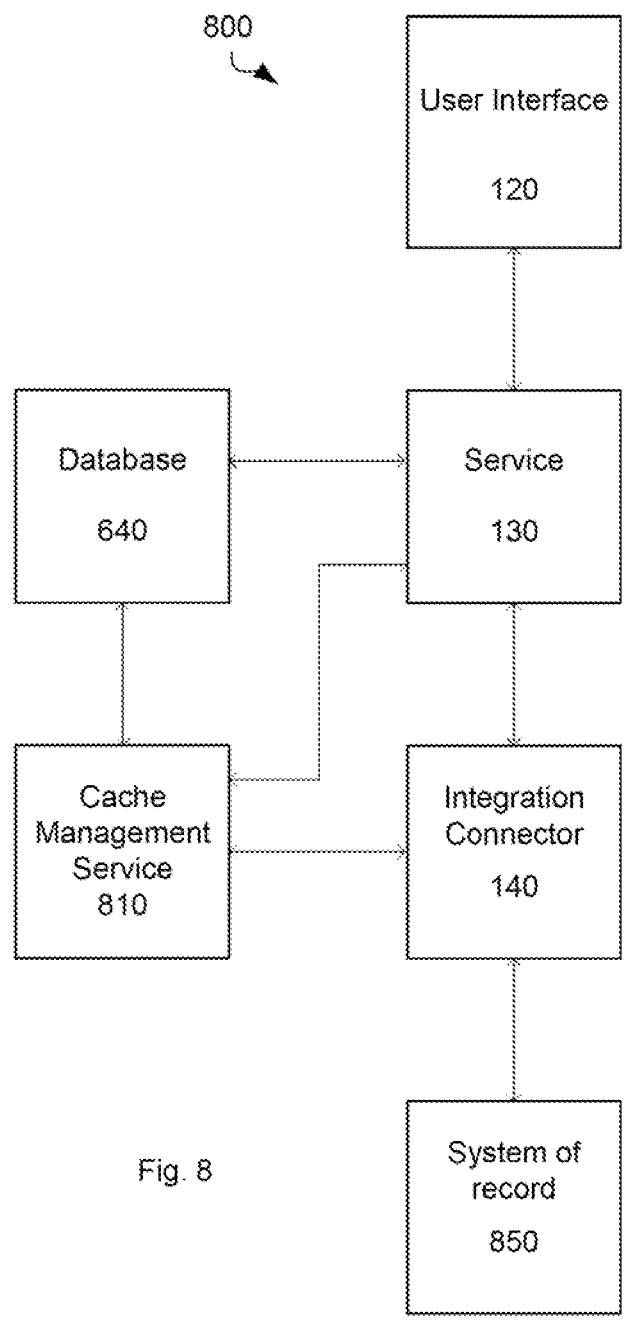
FIG. 8 illustrates a cache management system for managing data retrieval from system(s) of record.

FIG. 8 illustrates a cache management system 800 for managing data retrieval from the system(s) of record. The cache management system 800 comprises the database 640 to store cached data and a caching service 810 that controls retrieval of data from the system(s) of record 850. The caching service 810 may include configuration rules defining caching priorities for one or more categories of data. For example, the configuration rules may be specified in a configuration table. The caching service 810 may use asynchronous mechanisms, such as binary partition tree processes, to fetch data from the system of record and cache it to the database based on the configurable rules.

The one or more categories of data may include a first category of data that is required in real time, a second category of data that is required as soon as possible, and a third category of data that is cached periodically. The first category of data may include, for example, user data when creating a new account. The second category of data may include, for example, a payment history. The third category of data may include, for example, monthly average temperature.

The caching service 810 may be configured to retrieve data in the first category of data for the user interface 120 from the system of record 850. The caching service 810 may be configured to retrieve data in the second and/or third category of data for the user interface 120 from the database 850.

The deployed CSS system may invalidate one or more categories of data, for example, when a new account is created. The caching service 810 may be configured to retrieve data in an invalidated category of data for the user interface from the system of record 850.

In some embodiments, user interfaces and service within the deployed CSS system may directly access cache tables (read operations) to take advantage of OutSystems platform, such as via True Change, and allow simple calculations to be performed with the data, such as maximum, minimum, average, sorting, pagination and filtering.

Embodiments of the deployable and deployed CSS systems described herein may be used in conjunction with a wide range of backend systems without the need for adapting or changing the deployable CSS system. This benefit is provided by having a closed deployable CSS system which can be customised by deployment with integration connectors, such as plugins and drivers, to suit a customer's needs. For example, the deployable CSS system may be deployed in multiple countries, multiple languages and multiple legislative jurisdictions by adapting the deployable CSS system with suitable plugins. Customer messages may also be adapted via plugins. The deployable CSS system may be deployed to function with backends running different proprietary billing systems, with and on behalf of different utilities and/or organisations, by using integration connectors, such as drivers or APIs, which work with the backend system and the services. For example, the backend systems may include, but are not limited to, SAP, Oracle and Gentrack backend systems.

The closed nature of the deployable CSS systems may also isolate the backend from the end user providing improved privacy and cyber security when compared to many existing systems. For example, manipulation via the internet, such as code insertion, cannot occur in the closed parts of the system and therefore an end user cannot gain unauthorised access to information on the system of record.

Figure 9:
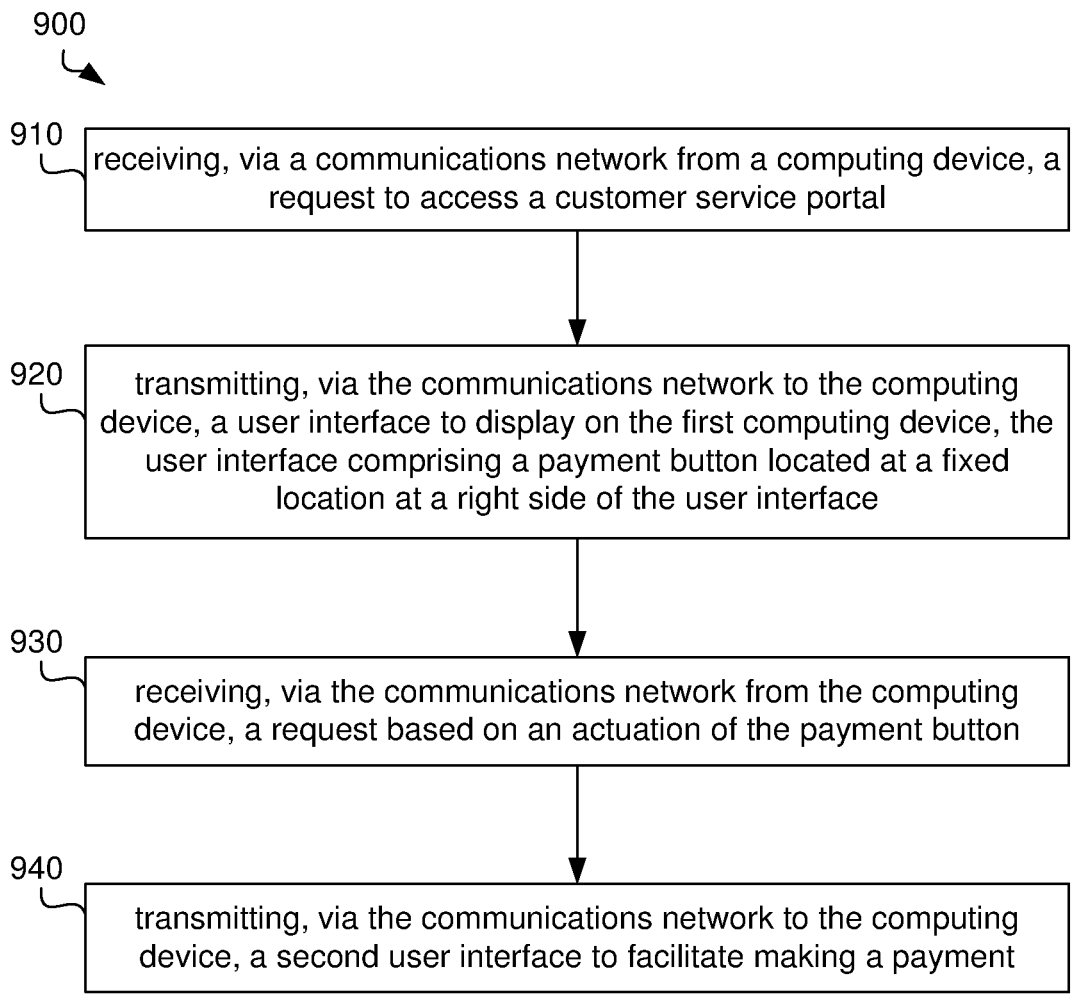
FIG. 9 illustrates a method for providing a payment interface.

FIG. 9 illustrates a method 900 for providing a payment interface for a utility related application. At step 910, the method 900 comprises receiving, via a communications network from a computing device, a request to access a customer service portal.

At step 920, the method 900 comprises transmitting, via the communications network to the computing device, a user interface to display on the first computing device, the user interface comprising a payment button located at a fixed location at a right side of the user interface. The payment button may form part of a payment division that stays located at the fixed location. The division may display a payment amount with the payment button.

The fixed location may be a fixed location in a window or a fixed location on the screen. The payment button or payment division may stay located at the fixed location in the window or on the screen when scrolling. The payment button or payment division may persist over a plurality of user interfaces. For example, a request to view a second user interface may be received via the communications network from the computing device, and the second user interface comprising the payment button located at the fixed location may be transmitted via the communications network to the computing device to display on the computing device.

At step 930, the method 900 comprises receiving, via the communications network from the computing device, a request based on an actuation of the payment button.

At step 940, the method 900 comprises transmitting, via the communications network to the computing device, a second user interface to facilitate making a payment.

In one aspect of the disclosure, a payment button is visible in the portal at all times. For example, the payment button stays permanently placed on the right hand side of the screen or window regardless of whether a user scrolls or changes to another user interface. In preferred embodiments, the payment button on the right hand side of the screen is displayed in exactly the same position consistently regardless of what user interface a user is viewing in the portal. This may allow a user to always be able to actuate the payment button in a single click to facilitate quick and easy payment of a bill.

Such positioning of the payment button is based on studies of where the eyes move when reading a page, where a user clicks when reading a page, and what information a user processes to pay a bill. The persistence of the payment button in the same position may also train a user to instinctively look for the payment button in that position.

Studies have shown that greater than 70% of customers start on the left of the screen and move to right where often a 'decision' point is expected or reached. That is, a user will prefer to look to the right of their screen to take action. This is also reinforced by reading from left to right in Western countries. A Westerner's eye typically travels down, eye movements scan and then end up finishing on the right hand side panel.

Additionally, the user interface as a whole may be designed based on knowledge of how people read web pages as well as hard copy bills. For example, navigation features are located on the far left of the page. This is where people typically look to find a list of current options (reference is made to https://www.nngroup.com/articles/horizontal-attention-leans-left/). The main content starts on the left but to the right of the navigation. The most important content is showcased between one-third and halfway across the screen or window as this is where users typically focus their attention the most. Secondary content may be placed further to the right, if needed.

The above placement of the payment button and other aspects of a user interface may be applied in the deployable CSS system 100 or another billing system. In the deployable CSS system 100, the payment button may persistent on the right hand side of all user interfaces 120 in the end user portal 514. In some implementations, the location of the payment button will not change between deployments.

Figure 10:
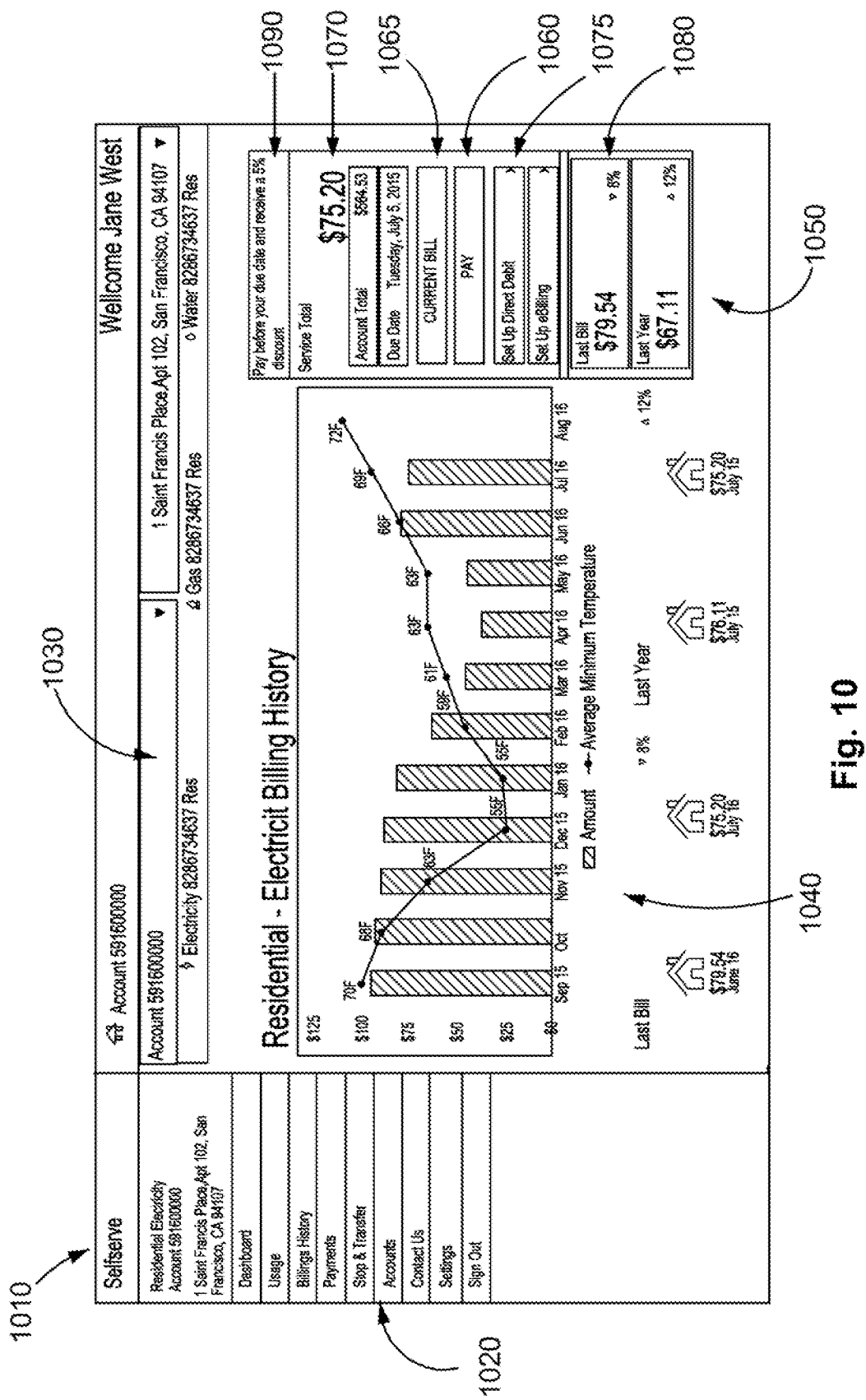
FIG. 10 illustrates an end user portal including a payment button for a utility related application.

FIG. 10 illustrates an end user portal 1010. The end user portal 1010 comprises a left navigation panel 1020, a top navigation panel 1030, main content 1040 and a payment panel 1050 at a right of the portal 1010. The payment panel 1050 comprises a payment button 1060 and is visible in the portal 1010 at all times. For example, the payment button 1060 or the whole payment panel 1050 stays permanently placed on the right hand side of the screen or window regardless of whether a user scrolls or changes to another user interface. In preferred embodiments, the payment button 1060 or the whole payment panel appears exactly in the same position consistently regardless of what user interface a user is viewing in the end user portal 1010. This may allow a user to always be able to actuate the payment button 1060 in a single click to facilitate quick and easy payment of a bill. For example, a bill may be paid via a payment screen in a small number of clicks, such as three clicks, to make a payment.

Based on the studies described above, in the portal 1010 shown in FIG. 10, the information for the usage is what customers will see first, and then their eye travels to the right and the final eye placement is on the right hand side panel where the payment button 1060 is located.

This may deliver significant benefits to both a customer and retailer, in that a customer may be required to make less decisions and may find the payment button more intuitively than in other bill payment systems. As a result a retailer may have bills paid more quickly.

The payment panel 1050 in the embodiment shown also includes other features to assist with customer decisions regarding bill payment, such as a current bill button 1065 that when actuated displays a current bill, a display of a price 1070 to be paid, a display of previous bill prices and percentage change in price 1080, bill payment options 1075 and an advertising space 1090. The due date may be displayed in a format that is based on a user's region or location settings. The bill payment options 1075 are shown to include a direct debit link to set up direct debiting for the user and an eBilling link to set up electronic billing. The previous bill prices and percentage change in price 1080 may include the price of the last bill and the price of the bill from the same period the year before. The percentages may be colour coded to indicate an increase or a decrease in the price. Where there is insufficient data or no previous bill, the percentage may be omitted.

Advertisements may be dynamically displayed in the advertising space 1090 of the payment panel 1050. For example, the following advertisement message may be displayed in the payment panel 1050 as a default: "Pay before your due date and receive a 5% discount!". The advertising space or other parts of the web portal may also be used by a company to promote and cross sell products and services.

The main content 1040, or user interfaces, may show consumption of a utility in a table or graph, such as a past 12 months energy consumption retrieved from a system of record and weather (current and seasonal) information retrieved from external weather service. The weather information may include current and trend weather patterns, past and projected storm conditions, past and predicted adverse weather conditions, and past and projected natural disaster (warning) type events, such as bushfire warnings.

The end user portal may allow a user to view outage details retrieved from a system of record. For example, the outage details may include past, past trend and/or planned outage information on a utilities network.

The information that CSS system retrieves from the systems of record may also include information on one or more of the following: solar energy generated or used, home battery storage, on and off premise electric vehicle energy management, peak vs non peak tariffs, access to community and/or local micro grids. Such information and analytics may be made available through smart meter installation and application.

The end user portal may allow a user to self-manage their utility settings. For example, the interfaces may display graphs and tables based on the information that CSS system retrieves from the system(s) of record and/or third party service(s) to allow intelligent energy management decision making for customers. Customers may configure their utility account via the end user portal based on the provided information to arrive at "best configuration" for daily, weekly, monthly energy management.

The CSS system may also provide backend analytics for the utility company to assist informed decision making on buying into the market, based on how consumers have used the energy management information provided to them. For example, an analytics framework may receive data from the CSS system via the integration connectors and provide the backend analytics.

Figure 11:
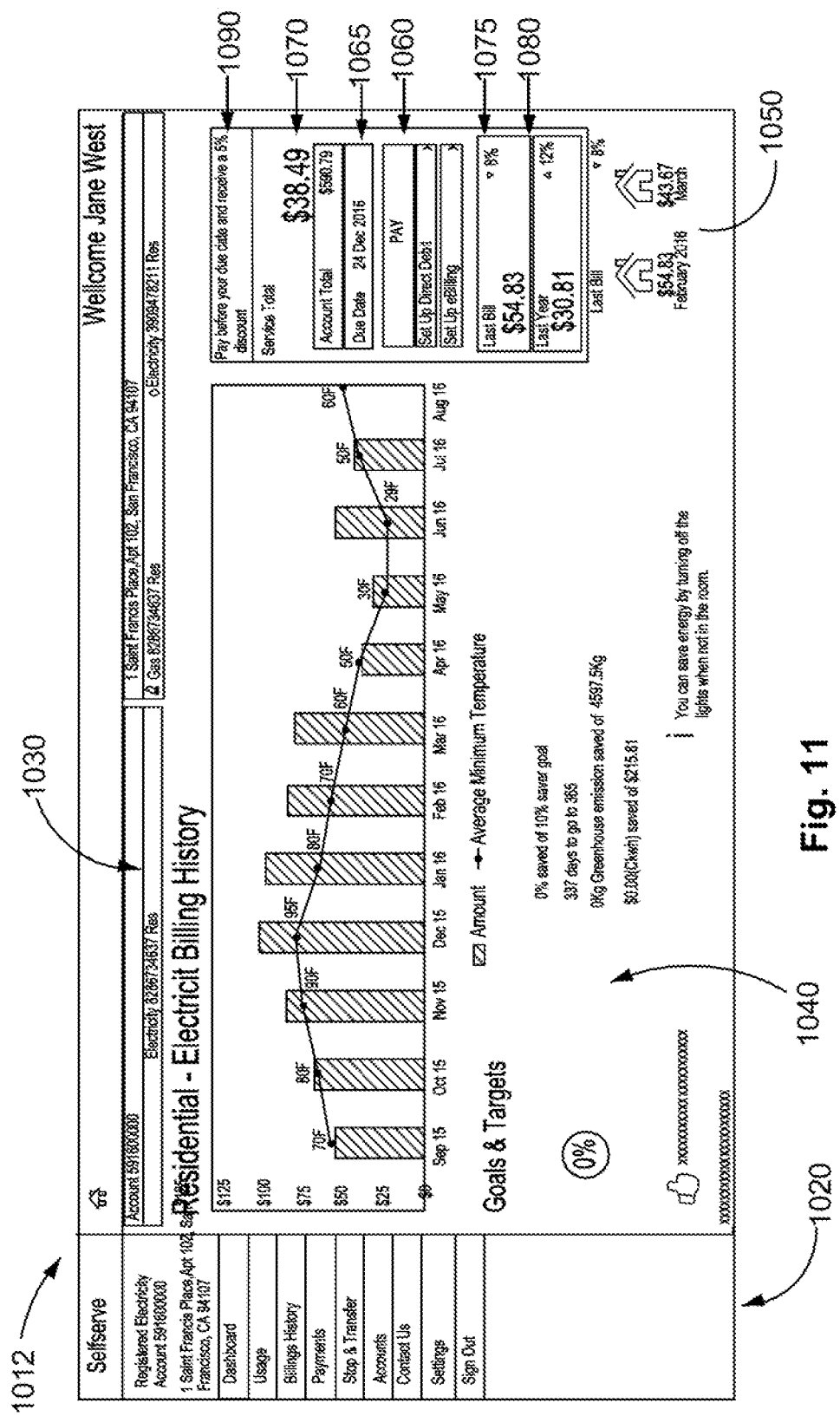
FIG. 11 illustrates another end user portal including a payment button for a utility related application.

FIG. 11 illustrates an end user portal 1012 that may be used instead of the end user portal 1010. The end user portal 1012 comprises a left navigation panel 1020, a top navigation panel 1030, main content 1040 and a payment panel 1050 at a right of the portal 1010. The payment panel 1050 comprises a payment button 1060 and is visible in the portal 1010 at all times.

The main content 1040 may include one of the user interfaces 120 and shows consumption of a utility in a graph, goals and targets for the user, and tips for how the user can save energy.

Figure 12:
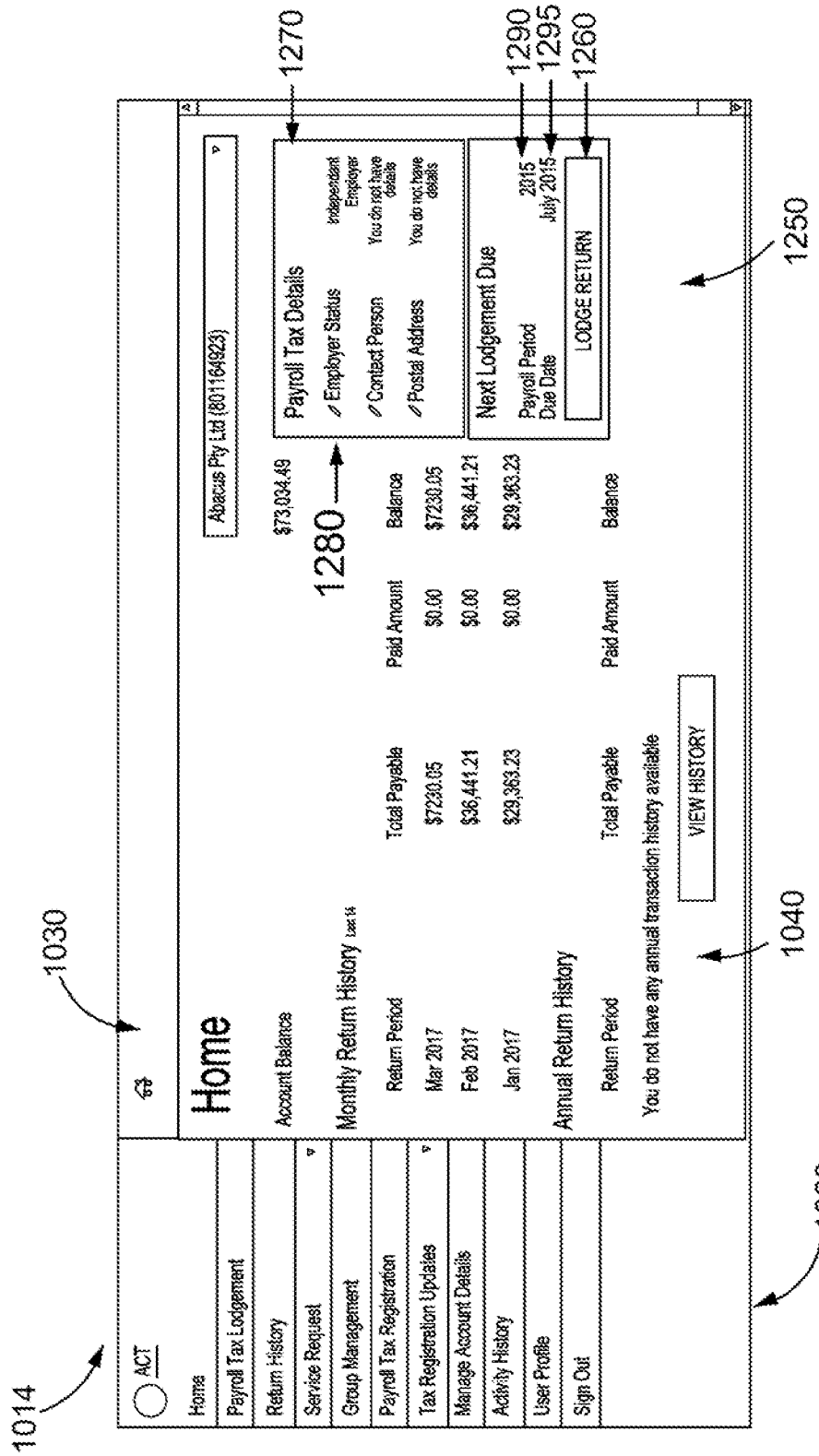
FIG. 12 illustrates an end user portal including a lodgement button for a tax related application.

FIG. 12 illustrates an end user portal 1014 for tax. The end user portal 1014 comprises a left navigation panel 1020, a top navigation panel 1030, main content 1040 and a lodgement panel 1250 at a right of the portal 1014. The lodgement panel 1250 comprises a lodgement button 1260 and is visible in the portal 1014 at all times. For example, the lodgement button 1260 or the whole lodgement panel 1250 stays permanently placed on the right hand side of the screen or window regardless of whether a user scrolls or changes to another user interface. In preferred embodiments, the lodgement button 1260 or the whole lodgement panel 1250 appears exactly in the same position consistently regardless of what user interface a user is viewing in the end user portal 1014. This may allow a user to always be able to actuate the lodgement button 1260 in a single click to facilitate quick and easy lodgement of a tax return.

The lodgement panel 1250 also comprises payroll tax details 1270 and edit buttons to edit the payroll tax details 1280. When the edit buttons are selected, the main content 1040 may be updated to enable editing of the payroll tax details, or a popup window may be generated to enable editing of the payroll tax details. Therefore, details for a tax return can be updated and lodged in a small number of clicks using the features of the lodgement panel 1250. The lodgement panel 1250 comprises a payment period indicator 1290 to indicate the taxation period to which the tax return relates. The lodgement panel 1250 comprises a due date indicator 1295 to indicate a date by which the tax return is required to be lodged. The main content 1040, or user interfaces, may show a monthly tax return history and/or an annual tax return history.

Figure 13:
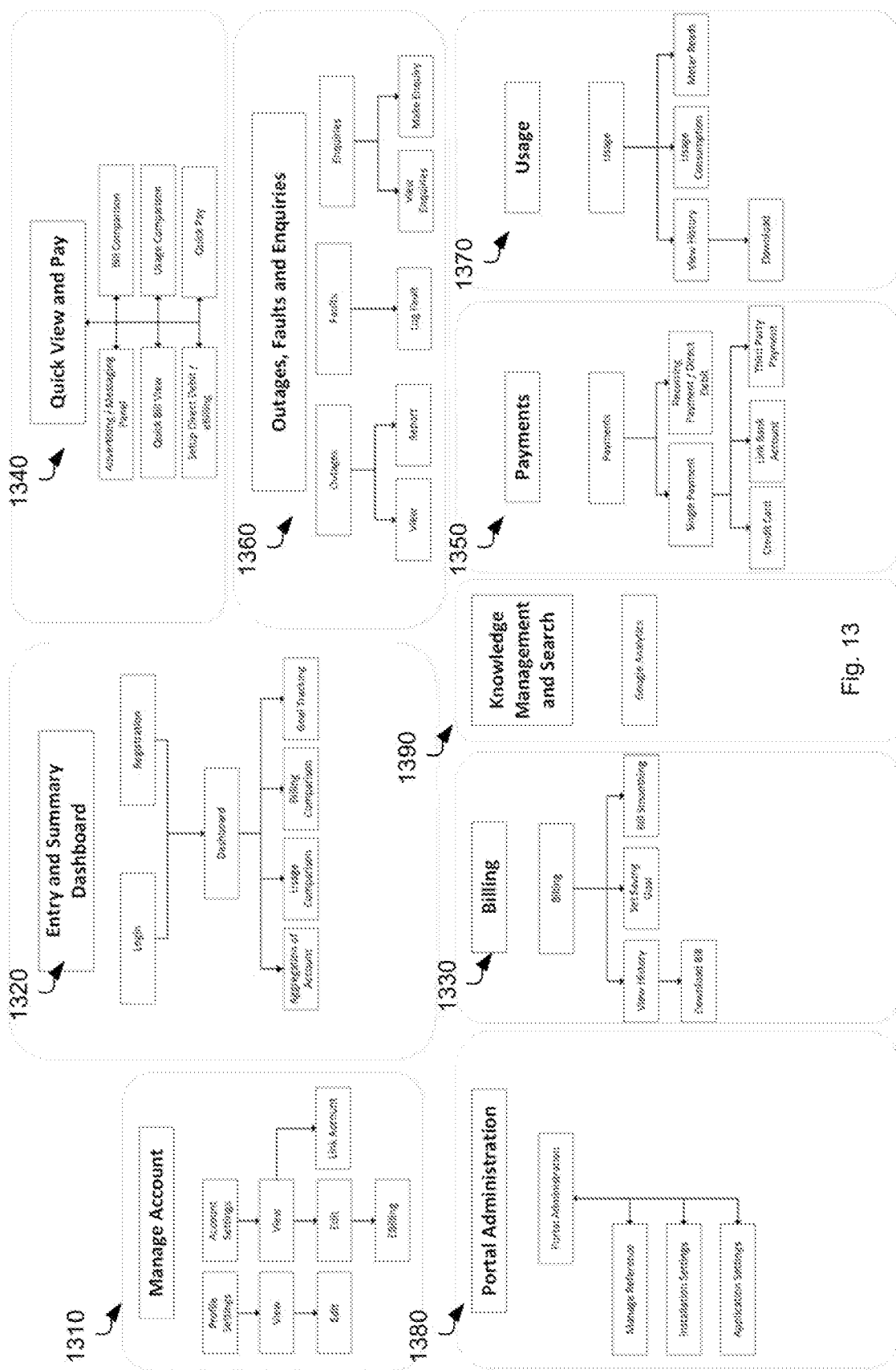
FIG. 13 illustrates example flow charts showing functions that may be performed in the deployed CSS system.

FIG. 13 illustrates example flow charts showing functions that may be performed in the deployed CSS system. The functions include account management functions 1310, login and dashboard functions 1320, billing management and display functions 1330, bill viewing and quick payment functions 1340, payment functions 1350, outages and fault information and reporting functions 1360, and usage monitoring and management functions 1370. The functions also include portal administration functions 1380 and knowledge management functions 1390 that are only accessible via the utility administration portal.

Figure 14:
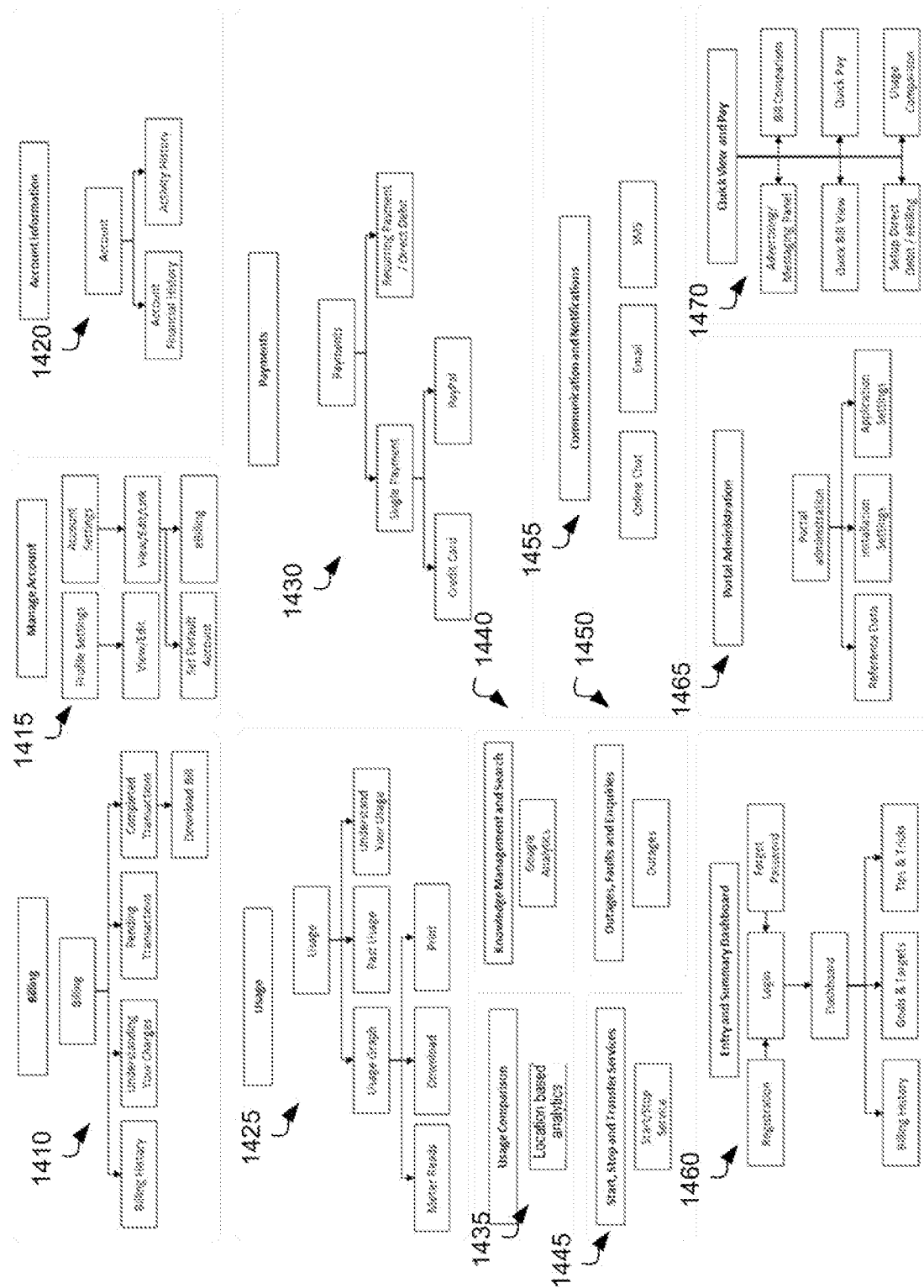
FIG. 14 illustrates example flow charts showing functions that may be performed in a deployed CSS system for a utility related application.

FIG. 14 illustrates example flow charts showing functions that may be performed in the deployed CSS system for a utility related application. The functions include billing functions 1410; manage account functions 1415; account information functions 1420; usage functions 1425; payments functions 1430; usage comparison functions 1435; knowledge management and search functions 1440; start, stop and transfer services functions 1445; outages, faults and enquiries functions 1450; communication and notifications functions 1455; entry and summary dashboard functions 1460; portal administration functions 1465; quick view and pay functions 1470. Some of the functions, such as the knowledge management and search functions 1440 or the portal administration functions 1465 may only be accessible via the utility administration portal.

Figure 15:
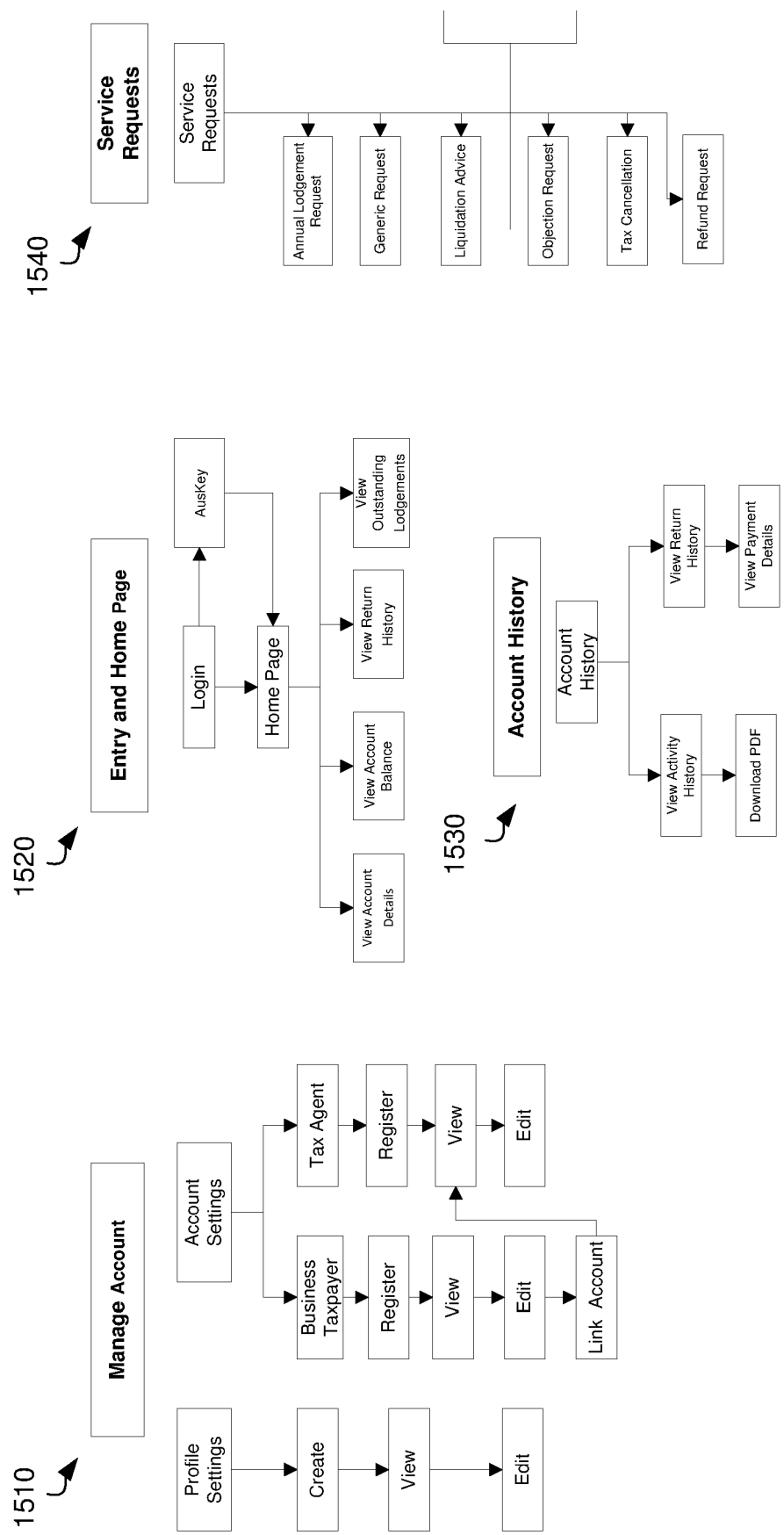
FIG. 15 illustrates example flow charts showing functions that may be performed in a deployed CSS system for a tax related application.
Figure 15A:
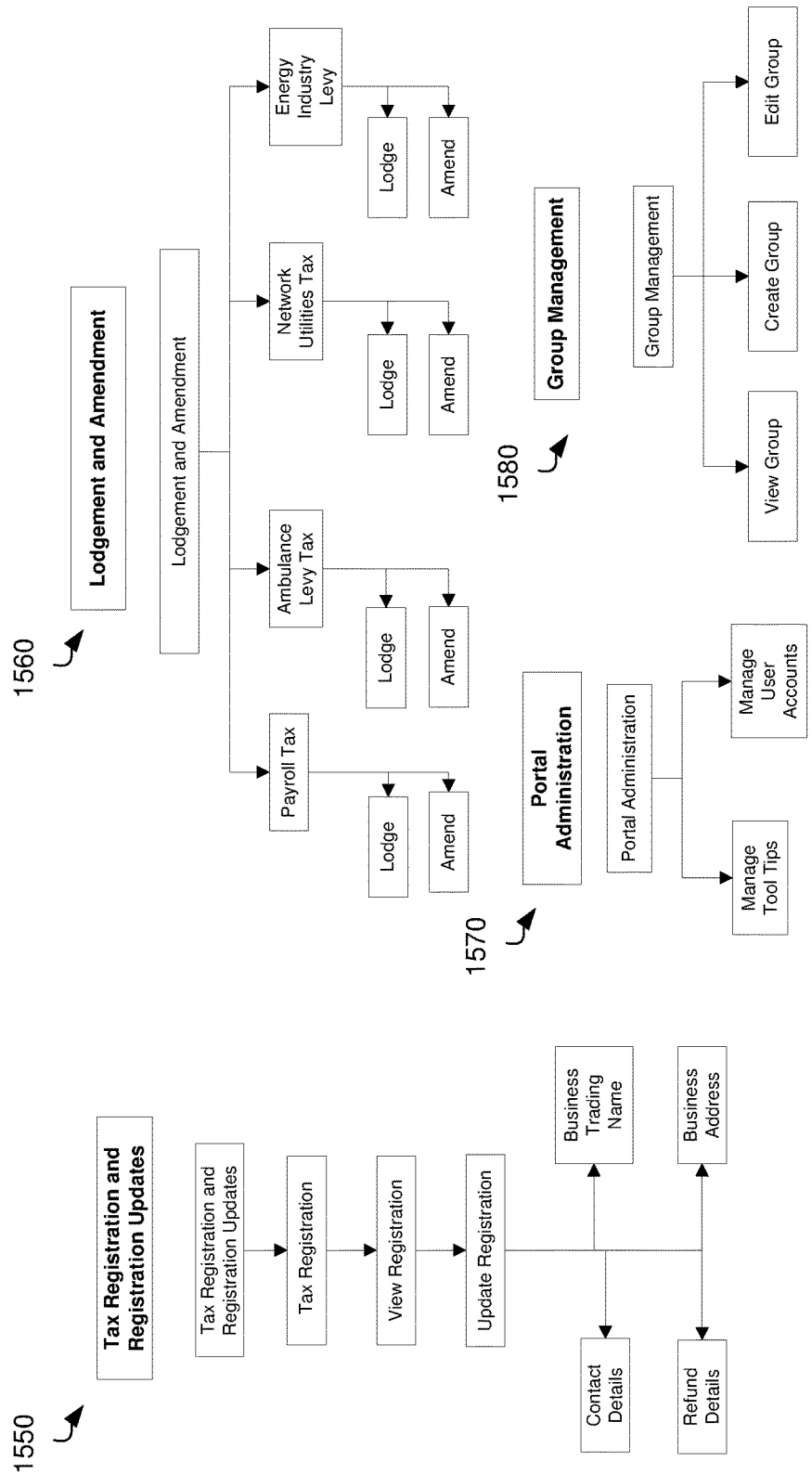
FIG. 15a illustrates example flow charts showing further functions that may be performed in a deployed CSS system for a tax related application.

FIGS. 15 and 15a illustrate example flow charts showing functions that may be performed in the deployed CSS system for a tax related application. The functions include manage account functions 1510, entry and home page functions 1520, account history functions 1530, service requests functions 1540, tax registration and registration updates functions 1550, lodgement and amendment functions 1560, portal administration functions 1570, and group management functions 1580. Some of the functions, such as the portal administration functions 1570 may only be accessible via the tax administration portal.

Figure 16:
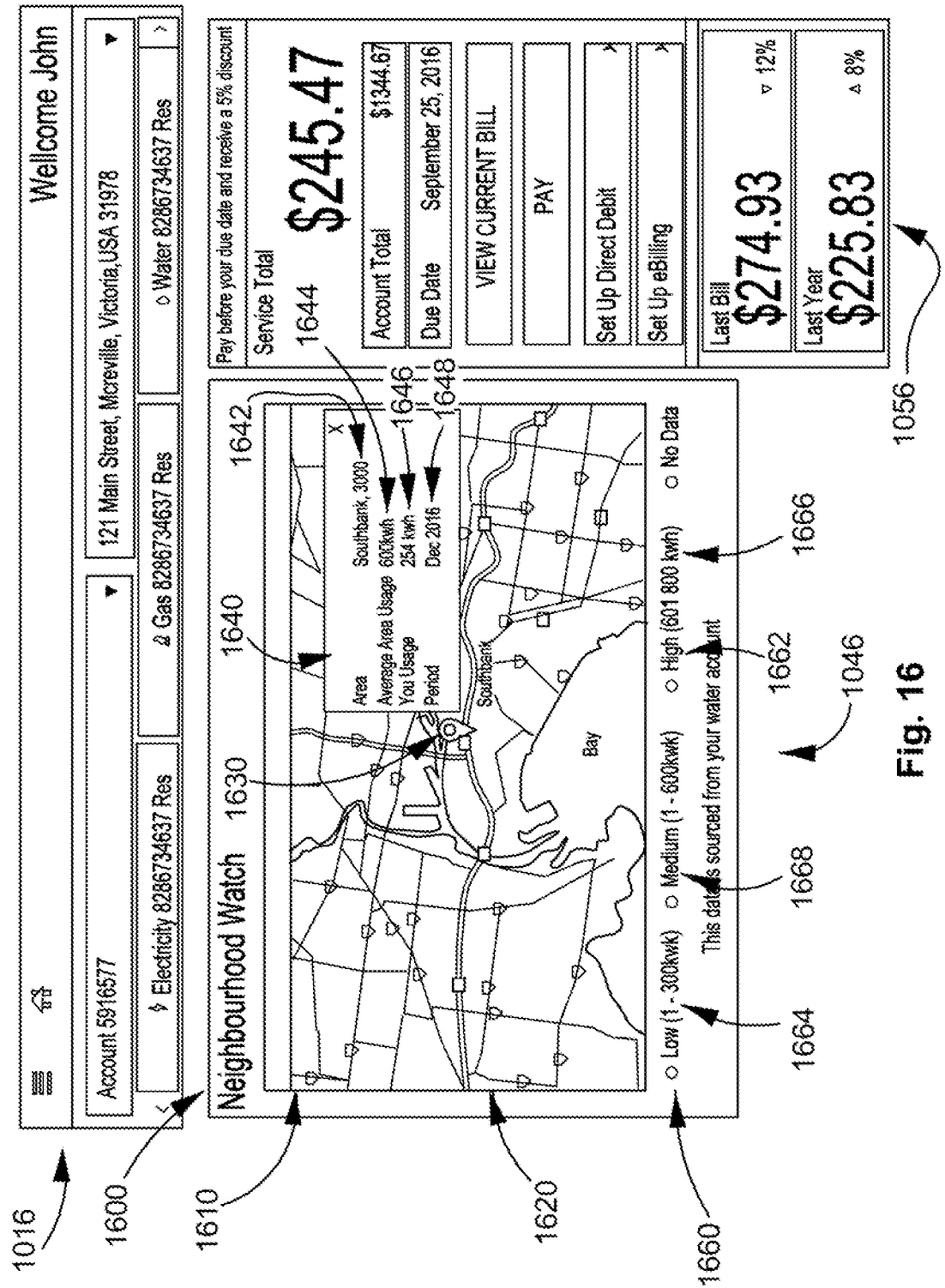
FIG. 16 illustrates a location based analytics user interface for a utility related application.

FIG. 16 illustrates an end user portal 1016 showing an example location based analytics interface 1600 in the main content 1046. The end user portal 1016 also shows a payment panel 1056 at a right side of the end user portal 1016. The location based analytics interface 1600 comprises a visual representation 1610 which may be used for comparing a utility user's usage to the average usage of utility users in their area. For example, the location based analytics interface 1600 may compare the utility user's usage from their last bill to the average of their postcode's usage for the same period. This may be a user's usage for the previous month, for example for users with interval meters, or a user's usage for their most recent billing period (e.g. quarterly), for example for users with basic meters.

The visual representation 1610 may comprise a map 1620 showing an area surrounding a specified site associated with the user. For example, the specified site may be associated with an account of the user in the deployed CSS system, such as for billing for utility usage. The site may be, for example, a house, unit, block of units, office building, office, industrial site, mining site, or any other type of site for which a usage may be measured for a user. The map 1620 may be generated in the location based analytics interface 1600 by the location based analytics service based on the Google™ API. The visual representation 1610 also comprises a location indicator 1630 which indicates a location of the specified site on the map 1620. The map 1620 may be centred on the location indicator 1630. Where a user's account identifies multiple sites, the visual representation 1610 may comprise a location identifier 1630 for each site. The location identifiers may be selectable to select among the user's sites.

The location identifier 1630 may be or include an icon or other identifier that is pinned at the location of the site on the map 1620, for example. In the example shown, the location identifier 1630 may be coloured according to a usage range in which the user's level of usage falls. A key 1660 may be displayed below the map 1610. The key may identify categories of usage 1662, a usage range for each category 1664, units of measure 1666 and a colour 1668 representing each category. For example, if the user's usage falls within a low usage category, such as 1-300 kWh, the location identifier 1630 may be coloured green. If the user's usage falls within a medium usage category, such as 301-600 kWh, the location identifier 1630 may be coloured orange. If the user's usage falls within a high usage category, such as >601 kWh, the location identifier 1630 may be coloured red. If there is no data on the user's usage available to the system, the location identifier 1630 may be coloured blue. While colour has been described to represent each category, in other embodiments categories may be distinguished by other means, such as a shape or fill pattern of the location identifier 1630, for example.

The visual representation 1610 may comprise a pop-up window 1640 that shows a comparison of the usage at a site of the user with an average usage of surrounding users, for example, users from the same area, suburb or region. The pop-up window 1640 may be shown by default, or opened when the location indicator 1630 for the site is selected. The pop-up window 1640 may comprise an area identifier 1642, an average area usage identifier 1644, a site usage identifier 1646 and a period identifier 1648. The area identifier 1642 may identify, for example, the premise's suburb and/or the premise's postcode. The average area usage identifier 1644 may identify, for example, the average usage for the postcode. The average usage may be for the period of utility user's last bill and/or in the service type's unit of measure e.g. 603 kWh. The site usage identifier 1646 may identify, for example, the utility user's usage from their last bill. The utility user's usage may be in the service type's unit of measure e.g. 254 kWh. The period identifier 1648 may identify, for example, the period to which average area usage identifier 1644 and the site usage identifier 1646 relate, such as the period of utility user's last bill.

The average usage for the area and the site usage in the pop-up window may be colour-coded based on the usage range in which they fall. The colour-coding may be the same as the colouring used for the location identifier(s) 1630.

In this example, the location based analytics may be referred to as "neighbourhood watch", for example, because a user may be compared to their neighbourhood or area. The location based analytics interface 1600 may be accessed via the user portal by selecting a "neighbourhood watch" menu item from the left navigation panel.

The utility administration portal may display a location based analytics administration interface to configure the location based analytics interface 1600. The location based analytics interface 1600 may be configured by changing the categories 1662, the usage ranges 1664, the units of measure 1666 and/or the colours 1668. For example, the location based analytics administration interface may provide controls or forms by which categories 1662, usage ranges 1664, units of measure 1666 and/or colours 1668 may be added, deleted or modified. In one example, the following categories and settings are implemented by default:

TABLE 1

Example default categories and settings

| Category | Unit of Measure | Range | Colour |
| --- | --- | --- | --- |
| No Data | kWh | 0 | Blue |
| Low | kWh | 1-300 | Green |
| Medium | kWh | 301-600 | Orange |
| High | kWh | >601 | Red |

Figure 17:
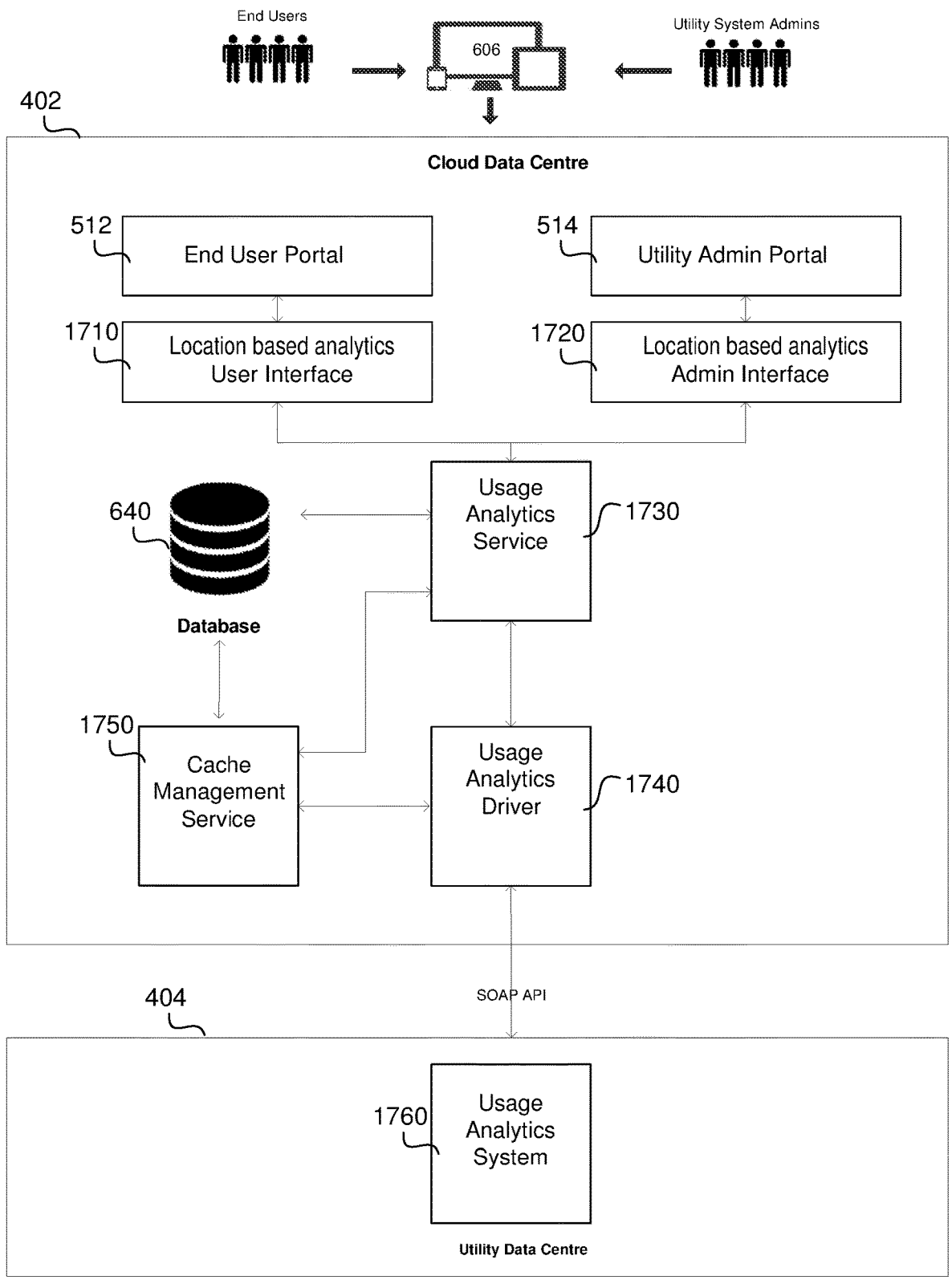
FIG. 17 illustrates example components of a deployed CSS system that are used for location based analytics.

FIG. 17 illustrates an overview of location based analytics system functionality in a deployed CSS system. The deployed CSS system is deployed in a cloud data centre 402. The deployed CSS system comprises a location based analytics user interface 1710 that is displayed in an end user portal 512 and a location based analytics administration interface 1720 that is displayed in a utility administration portal 514. Information is provided to the location based analytics user interface 1710 and the location based analytics administration interface 1720 by a usage analytics service 1730. A usage analytics driver 1740 is deployed as an integration connector to interface between the usage analytics service 1730 and a usage analytics system 1760 in a utility data centre 404, such as a utility organisation's system of record. A cache management service 1750 and a database 640 may be used to cache data from the usage analytics system 1760.

The CSS system may determine average usage for the area and the utility user's usage via data received by the usage analytics driver 1740 from the usage analytics system 1760. The average usage for the area and the utility user's usage may be based on a selected service for the site. For example, if the utility user is viewing an electricity service for the site, the data displayed is the user's electricity usage and the average electricity usage for the area. In some embodiments, the CSS system may be connected via one or more integration connectors to one or more other systems of record, such as other utility company's systems such that data from different utility companies can be collected to provide more complete data for an area.

While the CSS system has been described for use in relation to utilities and tax, in some embodiments the CSS system may be deployed for other applications such as telehealth, proximity group messaging, FinTech (finance focussed technology) or home management, for example. In some embodiments, components may be deployed for these applications as a module which modifies the base components as discussed above In one example, a CSS system for telehealth may provide telecommunication techniques for the purpose of providing telemedicine, medical education, and health education over a distance. This may allow exchange of health information and provide health care related services across geographic, time, social and cultural barriers, for example. The CSS system may comprise the following example components: a portal administration component, a quick view and pay component, a payment component, an account settings component, an account information component, a knowledge management component, a registration, login and forgot password component, and a communication and notifications component.

In one example, a CSS system for proximity group messaging may provide the ability for an individual to connect with social groups for a given proximity Individuals may use the CSS system to create/join different social groups and interact with members within a given proximity, for example. The CSS system may comprise the following example components: a portal administration component, a knowledge management component, a registration, login and forgot password component, and a communication and notifications component.

In one example, a CSS system for FinTech may be used to provide new technology and innovation for the delivery of financial services. Financial technology companies consist of both start-ups and established financial and technology companies trying to replace or enhance the usage of financial services of incumbent companies. The CSS system may comprise the following example components: a portal administration component, a quick view and pay component, a payment component, an account settings component, an account information component, a knowledge management component, a registration, login and forgot password component, and a communication and notifications component.

In one example, a CSS system for home management provides a centralised portal for consumers to manage appliances. The appliances may be managed automatically, programmatically and/or remotely based on time or on responses or signals from other appliances or sensors, for example. Appliances may also be managed manually. Home automation can improve the energy efficiency of a house, enabling consumer savings, reduced energy usage and also reducing appliance operating time. The CSS system may comprise the following example components: a portal administration component, a quick view and pay component, a payment component, an account settings component, an account information component, a knowledge manage-ment component, a registration, login and forgot password component, and a communication and notifications component.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A non-transitory computer-readable medium storing a deployable customer self-service (CSS) system adapted to be deployed in one or both of a cloud data center and a data center of a third party service, the deployable CSS system comprising:
   a user interface;
   a web portal configured to load and display the user interface;
   a plurality of services, wherein each of the plurality of services is configured to provide data to the user interface from a respective data source of a plurality of different data sources, each of the plurality of different data sources being a system of record or a third party service; and
   for each of the plurality of different data sources, a respective driver of a plurality of drivers for connecting the plurality of services to the respective data source, wherein the respective driver converts data from one or more formats used by the respective data source to a standard format used by the plurality of services, wherein the respective driver is selectable according to the respective data source so that each service of the plurality of services is agnostic to a format of the respective data source,
   wherein the deployable CSS system further comprises a caching service that controls retrieval of data from the plurality of different data sources,
   wherein the caching service stores the retrieved data from the plurality of different data sources in a database,
   wherein the caching service includes configuration rules defining caching priorities for two or more categories of data,
   wherein the two or more categories of data include a first category of data that is required in real time, and a second category of data that is cached periodically,
   wherein the caching service is configured to retrieve data in the first category of data from the plurality of different data sources in real time via each respective driver of the plurality of drivers for each data source of the plurality of data sources,
   wherein the caching service is configured to periodically retrieve data in the second category of data from the plurality of data sources via each respective driver of the plurality of drivers for each data source of the plurality of data sources and to cache the retrieved data in the second category to the database in the standard format, and wherein the web portal, the plurality of service, and the plurality of drivers comprise closed modules that are not editable upon deployment, and wherein drivers of the plurality of drivers are selectable during deployment.

2. The non-transitory computer-readable medium of claim 1, wherein the deployable CSS system further comprises a plurality of user interfaces, wherein:

the web portal is configured to selectively load and display the plurality of user interfaces, and the plurality of services are selectively loaded to provide data to a selected user interface based on the system of record or the third party service.

3. The non-transitory computer-readable medium of claim 2, wherein the plurality of drivers communicates with the plurality of services via a standard protocol.

4. The non-transitory computer-readable medium of claim 1, wherein the caching service invalidates the two or more categories of data, and the caching service is configured to retrieve data in an invalidated category of data for the user interface or from the system of record or the third party service.

5. The non-transitory computer-readable medium of claim 1, further comprising one or more base web portals, base user interfaces and/or base services, and one or more web portals, user interfaces and/or services that extend the one or more base web portals, base user interfaces and/or base services for a deployment.

6. The non-transitory computer-readable medium of claim 5, further comprising one or more closed modules that include the one or more web portals, user interfaces and/or services that extend the one or more base web portals, base user interfaces and/or base services for the deployment.

7. A system comprising a data center and a deployable customer self-service (CSS) system, the deployable CSS system being deployed in the data center, wherein the data center is one or both of a cloud data center and a data center of a third party service, the deployed CSS system comprising:

a user interface;

a web portal configured to load and display the user interface;

a plurality of services, each service of the plurality of services being configured to provide data to the user interface from a respective data source from among a plurality of different data sources, each of the plurality of different data sources being a system of record or the third party service;

for each of the plurality of different data sources, a specific driver of a plurality of drivers for connecting the plurality of services to the respective data source, wherein the specific driver converts data from one or more formats used by the respective data source to a standard format used by the plurality of services, the specific driver being selectable according to the respective data source so that each service of the plurality of services is agnostic to a format of the respective data source, wherein the deployed CSS system further comprises a caching service that controls retrieval of data from the plurality of different data sources;

wherein the caching service stores the retrieved data from the plurality of different data sources in a database;

wherein the caching service includes configuration rules defining caching priorities for two or more categories of data;

wherein the two or more categories of data include a first category of data that is required in real time, and a second category of data that is cached periodically;

wherein the caching service is configured to retrieve data in the first category of data from the plurality of different data sources in real time via each specific driver of the plurality of drivers for each of the plurality of data sources;

wherein the caching service is configured to periodically retrieve data in the second category of data from the plurality of data sources via each specific driver of the plurality of drivers for each of the plurality of data sources and to cache the retrieved data in the second category to the database in the standard format; and wherein the user interface, the web portal, the plurality of services, and the plurality of drivers comprise closed modules that are not editable, and wherein drivers of the plurality of drivers are selectable during deployment.

8. A computer-implemented method for deploying a deployable customer self-service (CSS) system, the deployable CSS system comprising:

one or more user interfaces;

a web portal configured to load and display the one or more user interfaces;

a plurality of services, each service of the plurality of services being configured to provide data to the one or more user interfaces from a respective data source from among a plurality of different data sources, each of the plurality of different data sources being a system of record or a third party service; and for each of the plurality of different data sources, a specific driver of a plurality of drivers for connecting the plurality of services to the respective data source, wherein the specific driver converts data from one or more formats used by the respective data source to a standard format used by the plurality of services, the specific driver being selectable according to the respective data source so that each service of the plurality of services is agnostic to a format of the respective data source;

wherein the deployable CSS system further comprises a caching service that controls retrieval of data from the plurality of different data sources, wherein the caching service stores the retrieved data from the plurality of different data sources in a database, and the caching service includes configuration rules defining caching priorities for two or more categories of data, wherein the two or more categories of data include a first category of data that is required in real time, and a second category of data that is cached periodically;

wherein the caching service is configured to retrieve data in the first category of data from the plurality of different data sources in real time via each specific driver of the plurality of drivers for each of the plurality of data sources;

wherein the caching service is configured to periodically retrieve data in the second category of data from the plurality of data sources via each specific driver of the plurality of drivers for each of the plurality of data sources and to cache the retrieved data in the second category to the database in the standard format, the computer-implemented method comprising:

receiving, from a computing device, specifications of the plurality of different data sources;

for each of the plurality of different data sources, selecting a driver specific to each data source to convert data from one or more formats used by the data source to a standard format used by the plurality of service;

deploying the deployable CSS system with the selected drivers for each of the plurality of different data sources to a data centre;

at the web portal, loading and displaying the one or more user interfaces;

at the caching service, controlling retrieval of data in the first category of data from the plurality of different data sources in real time via the selected drivers for each of the plurality of data sources, and controlling periodical retrieval of data in the second category of data from the plurality of data sources via the selected drivers for each of the plurality of data sources and caching of the retrieved data in the second category to the database in the standard format;

wherein the deployable CSS system comprises closed modules, wherein the closed modules comprise:

the one or more user interface, the web portal, and the plurality of services;

wherein the closed modules are not editable after deployment of the deployable CSS system.

9. The computer-implemented method of claim 8, wherein the one or more user interfaces comprises a first user interface and a second user interface, the computer-implemented method further comprising:

receiving, via a communications network from a second computing device, a request to access the web portal;

transmitting, via the communications network to the second computing device, the first user interface to display on the second computing device, the first user interface comprising a payment button located at a fixed location at a right side of the first user interface;

receiving, via the communications network from the second computing device, a request based on an actuation of the payment button; and transmitting, via the communications network to the second computing device, the second user interface of the deployable CSS system to facilitate making a payment.

10. The computer-implemented method of claim 9, further comprising receiving, via the communications network from the second computing device, a request to view a third user interface; and transmitting, via the communications network to the second computing device, the third user interface to display on the second computing device, the third user interface comprising the payment button located at the fixed location at the right side of the third user interface.

* * * * *

UNITED STATES PATENT AND TRADEMARK OFFICE
CERTIFICATE OF CORRECTION

| | |
|---|---|
| PATENT NO. | : 11,805,032 B2 |
| APPLICATION NO. | : 16/327894 |
| DATED | : October 31, 2023 |
| INVENTOR(S) | : Leon Madafferi and Gavin Bunshaw |

It is certified that error appears in the above-identified patent and that said Letters Patent is hereby corrected as shown below:

In the Claims

Claim 1, Column 21, Line 4, please replace "service" with --services--.

Signed and Sealed this
Nineteenth Day of December, 2023

*Katherine Kelly Vidal*

Katherine Kelly Vidal
*Director of the United States Patent and Trademark Office*